United States Patent
Shen et al.

(10) Patent No.: US 10,111,108 B2
(45) Date of Patent: Oct. 23, 2018

(54) RADIO BASE STATION, MOBILE STATION AND RADIO COMMUNICATION METHOD

(71) Applicant: NTT DOCOMO, INC., Tokyo (JP)

(72) Inventors: Jiyun Shen, Tokyo (JP); Satoshi Suyama, Tokyo (JP); Tatsunori Obara, Tokyo (JP); Yukihiko Okumura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 35 days.

(21) Appl. No.: 15/105,639

(22) PCT Filed: Dec. 18, 2014

(86) PCT No.: PCT/JP2014/083535
§ 371 (c)(1),
(2) Date: Jun. 17, 2016

(87) PCT Pub. No.: WO2015/093559
PCT Pub. Date: Jun. 25, 2015

(65) Prior Publication Data
US 2016/0323756 A1 Nov. 3, 2016

(30) Foreign Application Priority Data
Dec. 18, 2013 (JP) ................. 2013-261619

(51) Int. Cl.
*H04W 16/28* (2009.01)
*H04W 64/00* (2009.01)
(Continued)

(52) U.S. Cl.
CPC .......... *H04W 16/28* (2013.01); *H04B 7/0617* (2013.01); *H04B 7/0697* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 2005/0197071 A1* | 9/2005 | Yoshida | H04B 7/086 455/69 |
| 2013/0028186 A1 | 1/2013 | Kim | |
| 2013/0301584 A1* | 11/2013 | Addepalli | H04W 4/046 370/329 |

FOREIGN PATENT DOCUMENTS

| | | |
|---|---|---|
| JP | H07087011 A | 3/1995 |
| WO | 2013015636 A2 | 1/2013 |

OTHER PUBLICATIONS

International Search Report issued in corresponding application No. PCT/JP2014/083535 dated Mar. 31, 2015 (3 pages).
(Continued)

*Primary Examiner* — Kouroush Mohebbi
(74) *Attorney, Agent, or Firm* — Osha Liang LLP

(57) ABSTRACT

To improve system performance for mobile communications (group mobility) in a plurality of terminals existing inside the same moving object, a radio base station, which forms a cell on a moving path of a moving object to communicate with a mobile station provided in the moving object using beam forming, is provided with a transmission section that transmits a plurality of acquisition signals applied with different beam forming weights respectively to at least an edge region of the cell formed on the moving path of the moving object, and a control section that controls a beam forming weight to apply to a data signal transmitted to the mobile station, based on information notified from the mobile station receiving an acquisition signal.

17 Claims, 23 Drawing Sheets

(51) Int. Cl.
*H04B 7/06* (2006.01)
*H04L 5/00* (2006.01)
*H04L 25/02* (2006.01)

(52) U.S. Cl.
CPC ........ *H04L 5/0053* (2013.01); *H04L 25/0202* (2013.01); *H04W 64/006* (2013.01)

(56) References Cited

OTHER PUBLICATIONS

Written Opinion of the International Searching Authority issued in corresponding application No. PCT/JP2014/083535 dated Mar. 31, 2015 (3 pages).
3GPP TR 36.814 V9.0.0, "3rd Generation Partnership Project; Technical Specification Group Radio Access Network; Evolved Universal Terrestrial Radio Access (E-UTRA); Further advancements for E-UTRA physical layer aspects (Release 9)"; Mar. 2010 (107 pages).
Office Action issued in the counterpart Japanese Patent Application No. 2013-261619, dated Feb. 13, 2018 (8 pages).

\* cited by examiner

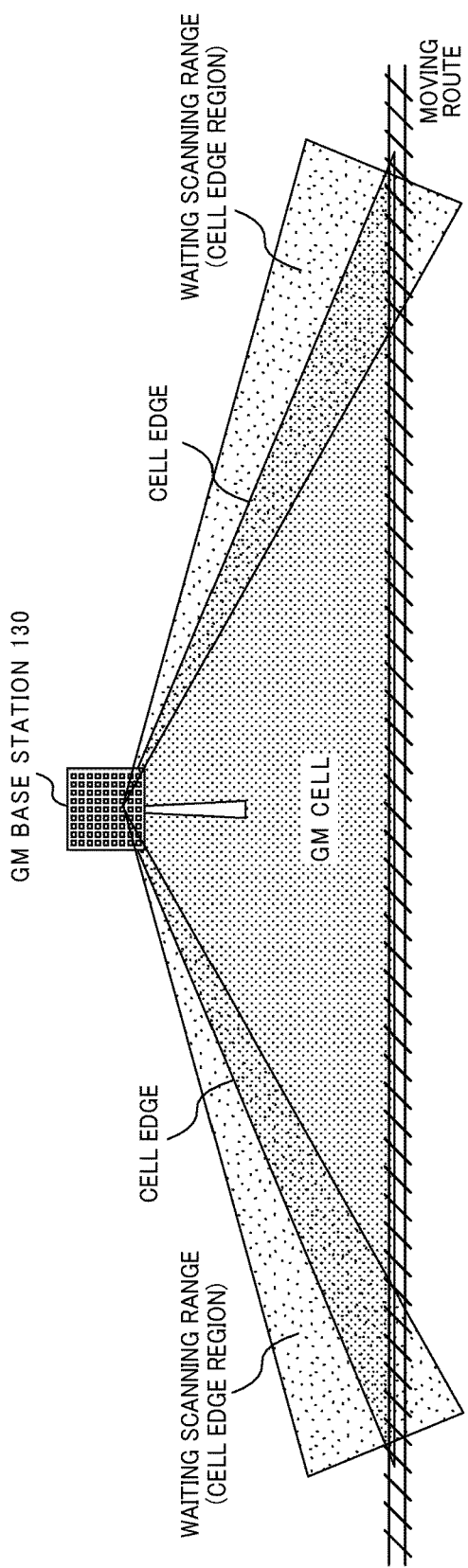
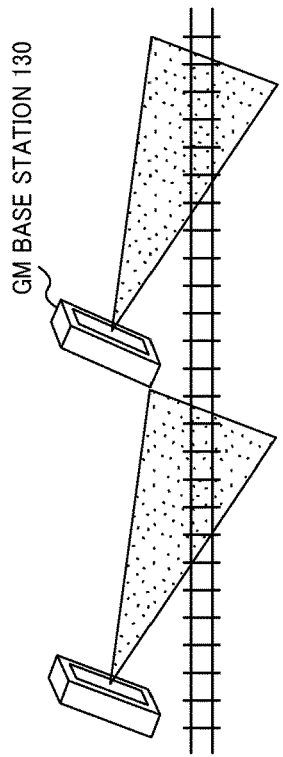
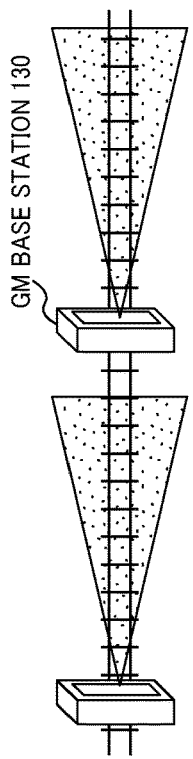
FIG. 5A
FIG. 5B

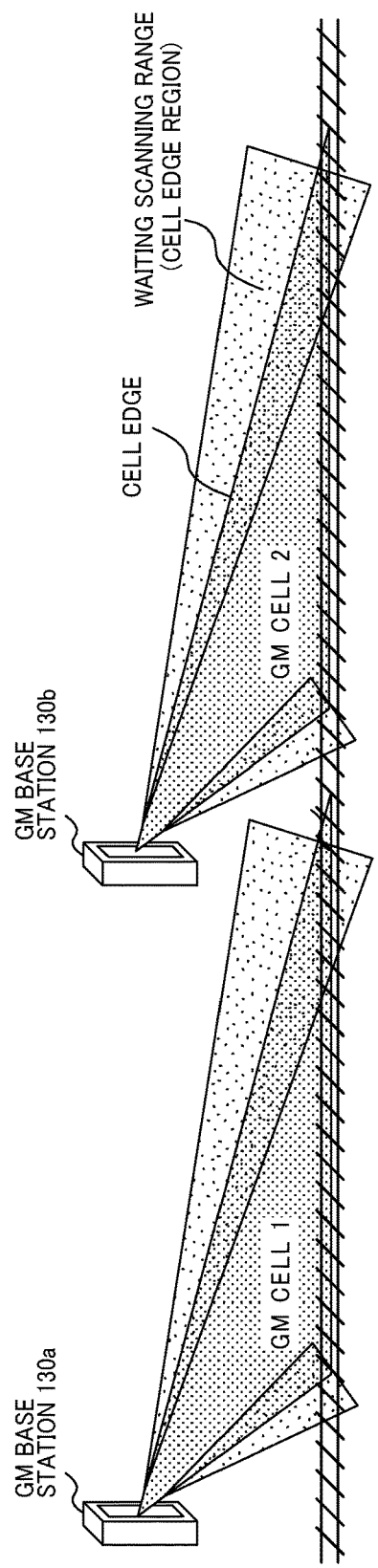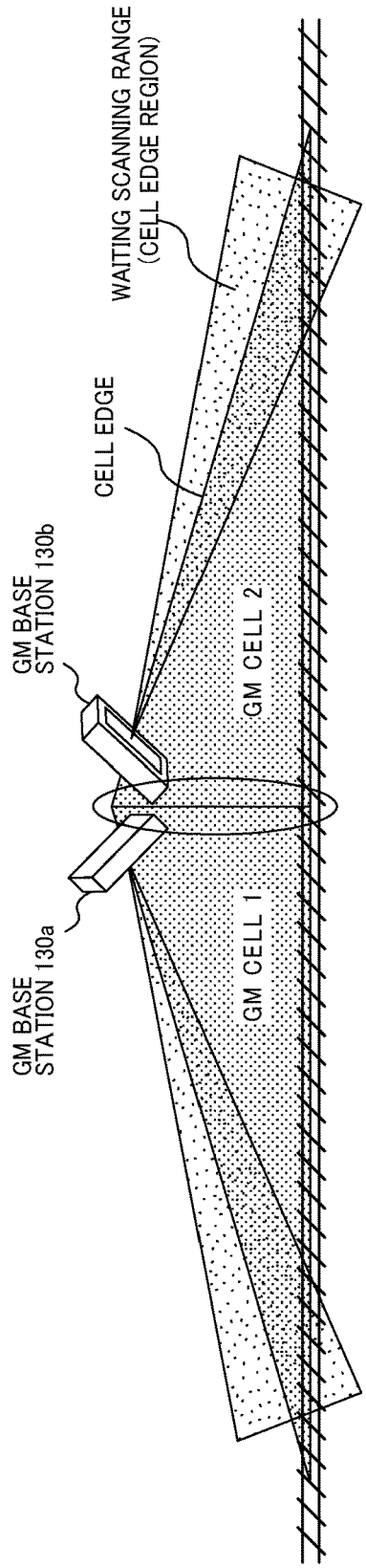
FIG. 6A
FIG. 6B

EXAMPLE OF BEAM ACQUISITION

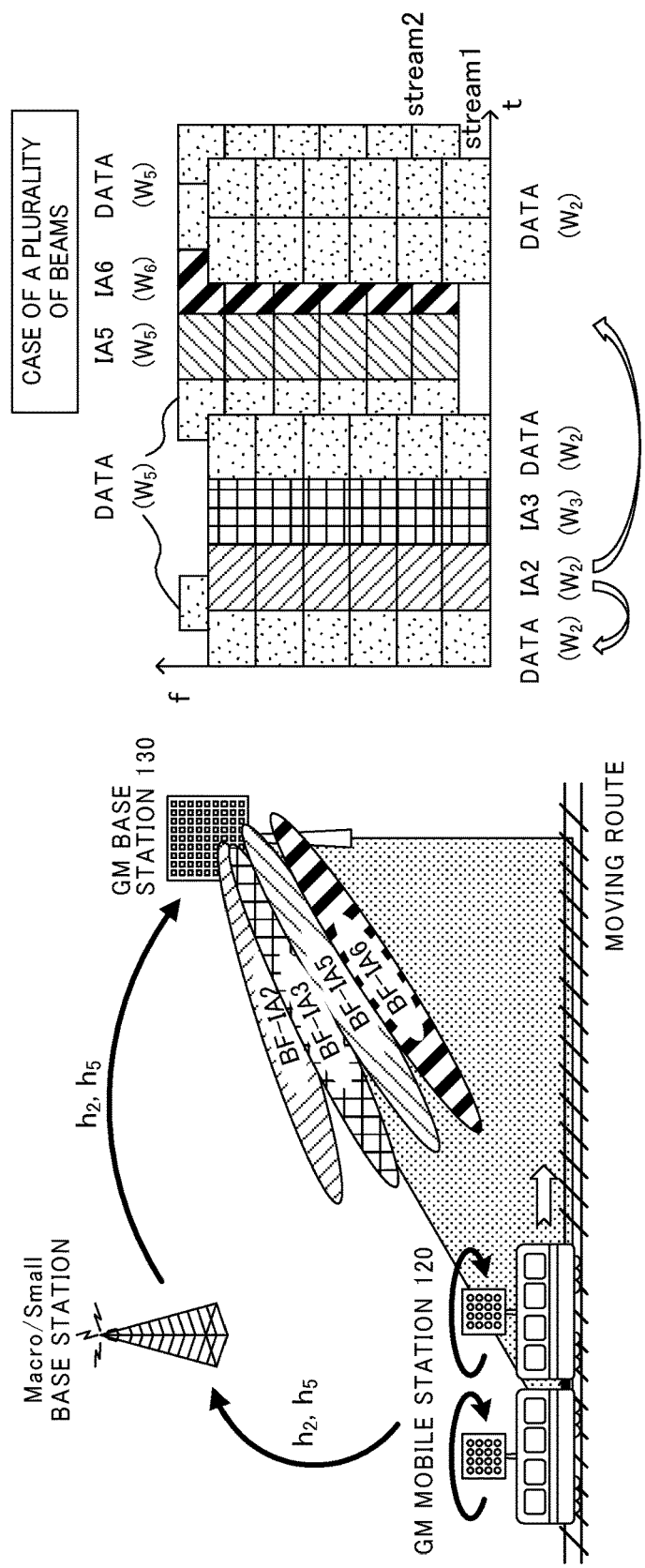

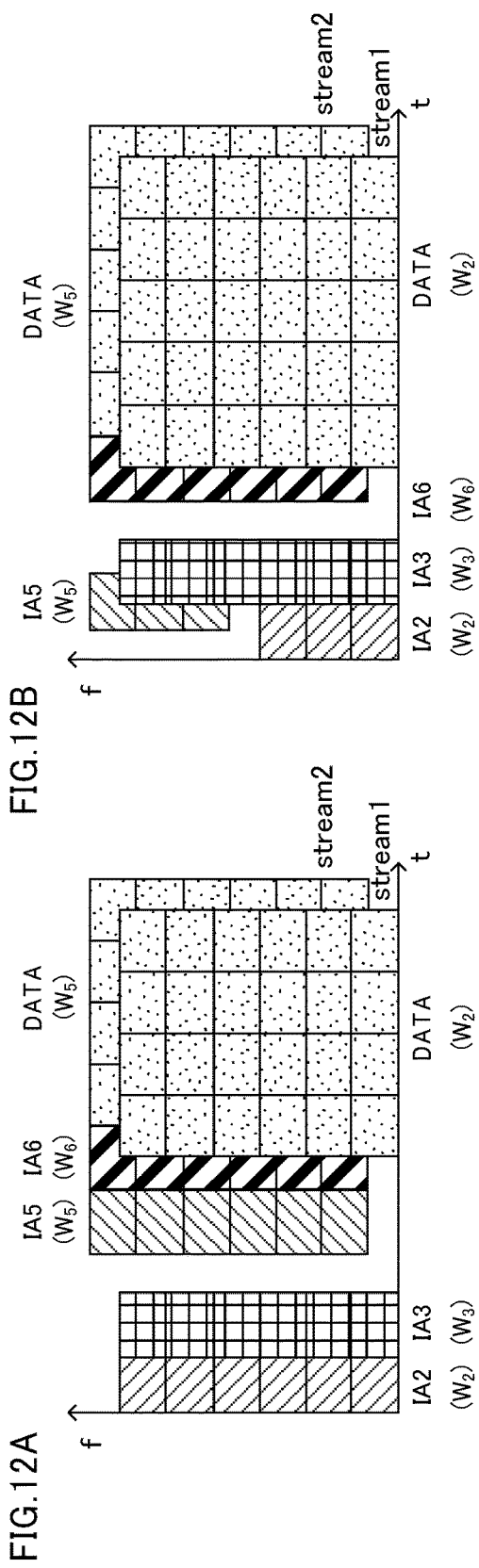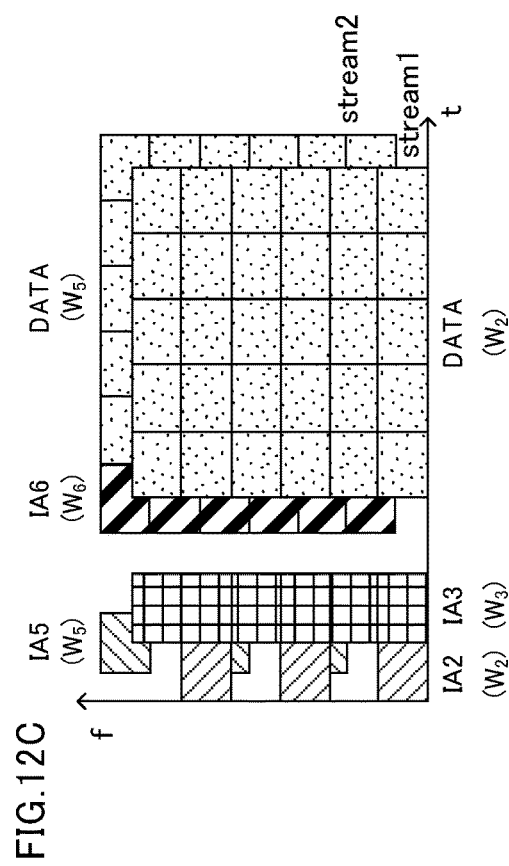

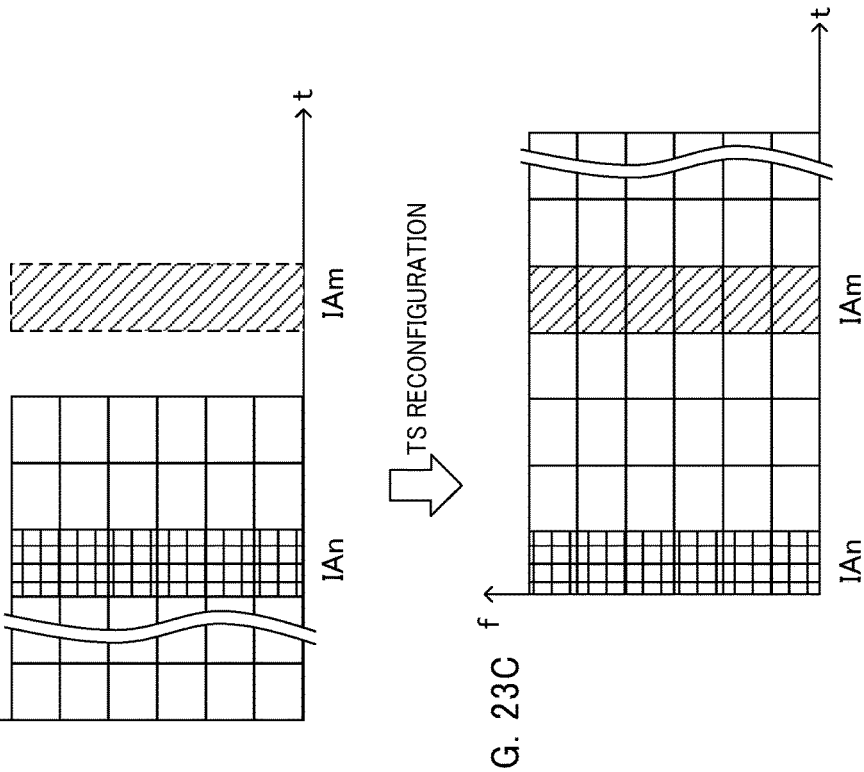
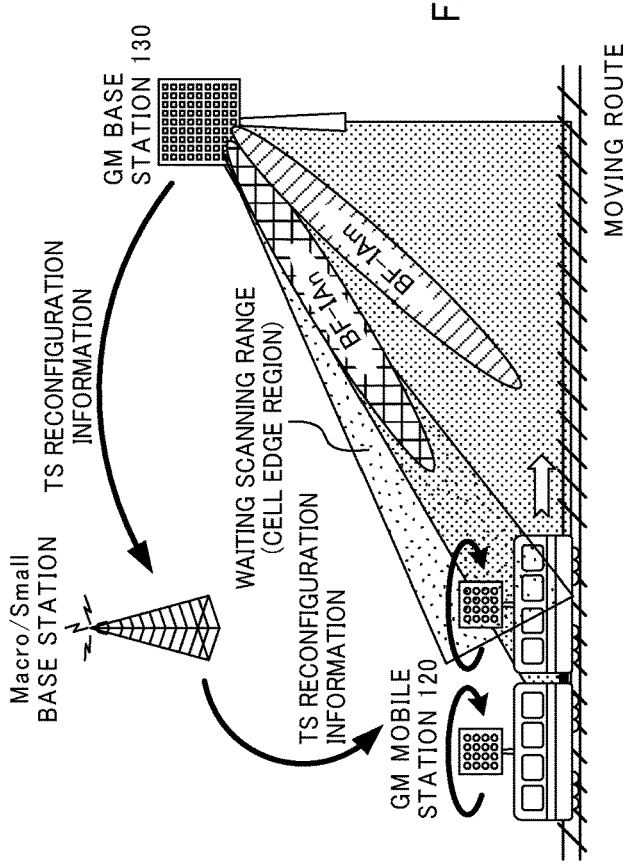
FIG. 23B
FIG. 23C
FIG. 23A

RADIO BASE STATION, MOBILE STATION AND RADIO COMMUNICATION METHOD

TECHNICAL FIELD

The present invention relates to a radio base station, mobile station and radio communication method in mobile communications (group mobility) in a plurality of terminals existing in the same moving object.

BACKGROUND ART

In LTE (Long Term Evolution) and a successor system (for example, also referred to as LTE-Advanced, FRA (Future Radio Access), 4G and the like) to LTE, radio communication systems (for example, also referred to as Heterogeneous network) have been studied in which a small cell (including a picocell, femtocell and the like) having relatively small coverage with a radius of about several meters to several tens of meters is arranged, while overlapping a macrocell having relatively large coverage with a radius of about several hundreds of meters to several kilometers (for example, Non-patent Literature 1).

In such a radio communication system are studied a scenario (for example, also referred to as co-channel) using the same frequency band in both the macrocell and the small call, and another scenario (for example, also referred to as separate frequency) using different frequency bands in the macrocell and the small cell. More specifically, in the latter scenario, it is studied that a relatively low frequency band (for example, 2 GHz) is used in the macrocell, and that a relatively high frequency band (for example, 3.5 GHz, 10 GHz and the like) is used in the small cell.

CITATION LIST

Non-Patent Literature

[Non-patent Literature 1] 3GPP TR 36.814 "E-UTRA Further advancements for E-UTRA physical layer aspects"

SUMMARY OF INVENTION

Technical Problem

In addition, in the conventional radio communication system, in mobile communications (also referred to as Group Mobility, GM and the like) in a plurality of user terminals existing inside the same moving object (for example, train, bus, ship and the like), each of the terminals communicates with a radio base station individually. Therefore, there is the risk that system performance degrades due to loads by control signals, inter-terminal interference and the like. Particularly, in the case where a moving object including a plurality of user terminals passes through a cell boundary, there is the problem that degradation of system performance is remarkable.

The present invention was made in view of such a respect, and it is an object of the invention to provide a radio base station, mobile station and radio communication method for enabling system performance to be improved for group mobility.

Solution to Problem

A radio base station of the present invention is a radio base station for forming a cell on a moving path of a moving object to communicate with a mobile station provided in the moving object using beam forming, and is characterized by having a transmission section that transmits a plurality of acquisition signals applied with different beam forming weights respectively to at least an edge region of the cell formed on the moving path of the moving object, and a control section that controls a beam forming weight to apply to a data signal transmitted to the mobile station, based on information notified from the mobile station receiving an acquisition signal.

Advantageous Effects of Invention

According to the present invention, it is possible to improve system performance for mobile communications (group mobility) in a plurality of terminals existing inside the same moving object.

BRIEF DESCRIPTION OF DRAWINGS

FIG. 5 contains diagrams showing one example of an installation form of a GM cell formed by the GM base station;

FIG. 6 contains diagrams showing one example of a method of setting a waiting scanning range (cell edge region) in the GM cell formed by the GM base station;

FIG. 11 contains explanatory diagrams of communication operation of the GM base station and GM mobile station in the cell edge region (when the GM mobile station acquires a plurality of beams);

FIG. 12 contains explanatory diagrams of communication operation of the GM base station and GM mobile station in the cell edge region (when the GM mobile station acquires a plurality of beams);

FIG. 23 contains explanatory diagrams of time slot reconfiguration operation in the GM base station.

DESCRIPTION OF EMBODIMENTS

Figure 1:
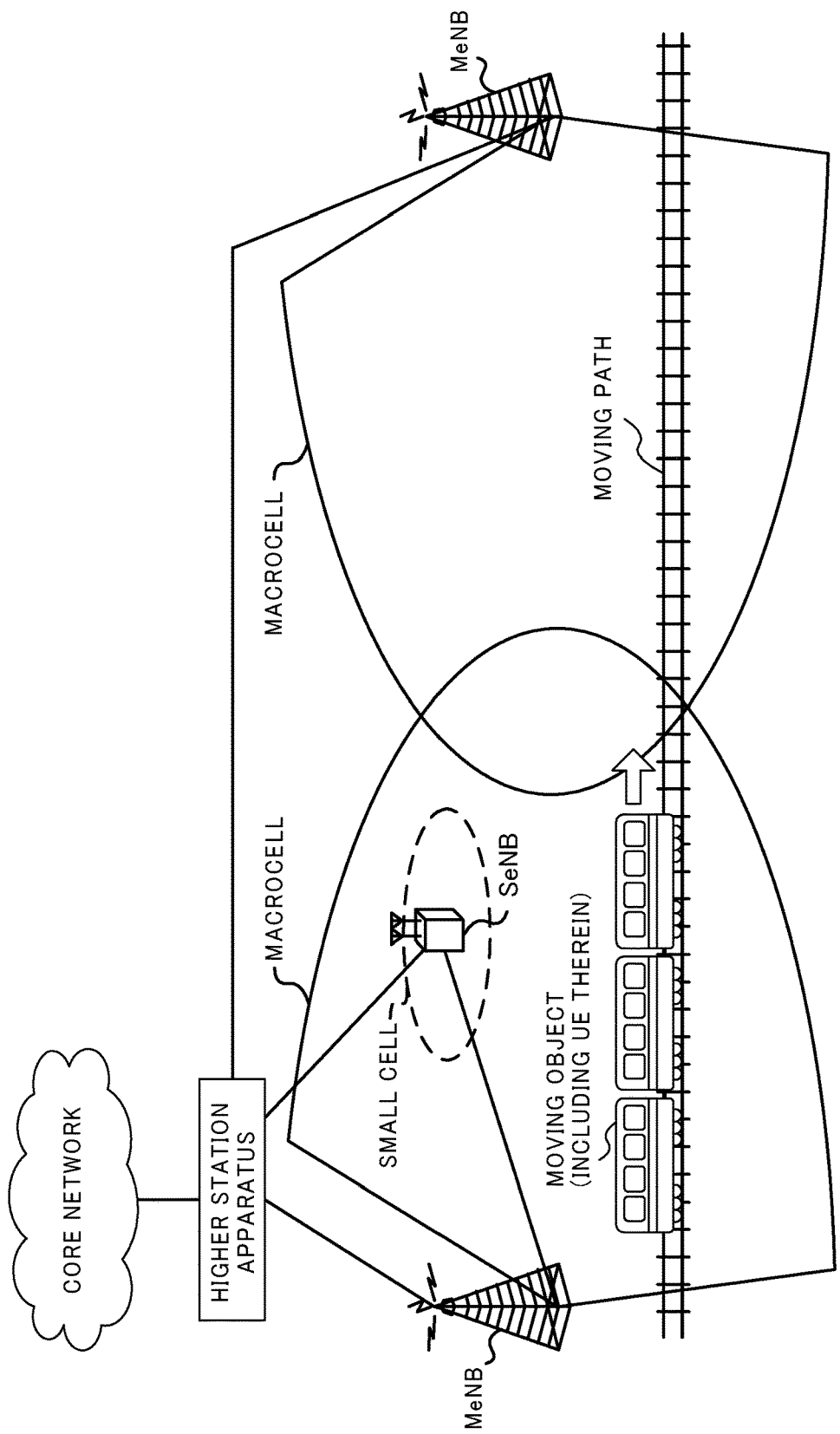
FIG. 1 is one example of a conceptual diagram of a network configuration to which is applied a radio communication system according to this Embodiment.

FIG. 1 is one example of a conceptual diagram of a network configuration to which is applied a radio communication system according to this Embodiment. The network configuration as shown in FIG. 1 includes radio base stations each (hereinafter, referred to as macro base station or MeNB (Macro eNodeB)) for forming a macrocell, a radio base station (hereinafter, referred to as small base station or SeNB (Small eNodeB)) for forming each small cell, and user terminals (UE: User Equipment) for communicating with at least one of the macro base station and small base station. In FIG. 1, a moving object (for example, train) moves along a predetermined moving path (for example, track), and a plurality of user terminals is included inside the moving object. Further, FIG. 1 illustrates the network configuration where the small base station forms the small cell while overlaying on the range (coverage, cell area) covered by the macrocell.

In the network configuration as shown in FIG. 1, it is studied that a carrier F1 (for example, 2 GHz-band) with a relatively low frequency band (hereinafter, referred to as low-frequency band) is used in the macrocell, and that a carrier F2 (for example, 3.5 GHz-band, 10 GHz-band and the like) with a relatively high frequency band (hereinafter, referred to as high-frequency band) is used in the small cell. In addition, the network configuration to which is applied the radio communication system according to this Embodiment is not limited to the configuration as shown in FIG. 1. For example, the present invention is also applicable to the case where the small cell is formed on the moving path, and a radio communication system without the small base station.

It is also studied that coverage securing and mobility support is performed in the macrocell using the carrier F1 with the low-frequency band, and that capacity growth and offload is performed (also referred to as Macro-assisted, C/U-plane split and the like) in the small cell using the carrier F2 with the high-frequency band. For example, when a user terminal is capable of connecting to both the macro base station and the small base station, it is possible to split and control so that the macrocell supports a C (Control)-plane for handling control messages, and that the small cell supports a U (User)-plane for handling user data.

Further, generally, in proportion to a frequency f, path-loss increases. Therefore, in the small cell in which the carrier F2 with the high-frequency band is used, it is studied to compensate for path-loss by applying beam forming (BF) with MIMO (Multiple Input Multiple Output), Massive MIMO (also referred to as three-dimensional (3D)/Massive MIMO) and the like.

Herein, the beam forming (BF) is a technique for controlling amplitude and phases of respective transmission/reception signals in a plurality of antenna elements, thereby providing a transmission/reception beam with directivity, and also enabling a shape of the beam to be changed. In this beam forming, generally, as the number of antenna elements increases, it is possible to perform more sophisticated control. In other words, corresponding to the number of antenna elements, it is possible to control the number of beams, the shape of each beam (width of the beam in a horizontal plane, width of the beam in a vertical plane, etc.) and the direction and gain of the beam in detail. For example, by narrowing the width of the beam (i.e. forming a narrow beam), it is possible to obtain high gain (power density).

In a Massive MIMO transmission scheme, a data rate (frequency usage efficiency) is increased by transmitting data using a large number (for example, 100 or more) of antenna elements. Since data is transmitted using a large number of antenna elements, it is possible to improve transmission efficiency associated with multiplexing as compared with the case of using a small number of antenna elements, and it is possible to perform radio communication at higher speed than conventional communication. Further, sophisticated beam forming is made possible by combinations of a large number of antenna elements.

In the network configuration as shown in FIG. 1, the macro base station and small base station are connected to a higher station apparatus (also called the central control station or higher node). The higher station apparatus is connected to a core network. For example, the central control station includes an access gateway apparatus, Radio Network Controller (RNC), Mobility Management Entity (MME) and the like. In addition, such a configuration may be made where a part or the whole of functions of the higher station apparatus are provided in the macro base station.

In addition, in the conventional radio communication system, in mobile communications (GM (Group Mobility)) in a plurality of user terminals existing inside a single moving object (for example, train, bus, ship and the like), each of the terminals communicates with a radio base station individually. As a result, there is the risk that system performance degrades due to loads by control signals, inter-terminal interference and the like. For example, in FIG. 1, when the moving object passes through the macrocell boundary, since each of the user terminals inside the moving object performs handover simultaneously, large amounts of process arise to control the handover, and system performance degrades.

Further, in the case where the radio base station and user terminal inside the moving object are not able to perform accurate precoding due to fast channel variations associated with movement of the moving object, inter-terminal interference occurs, and communication performance degrades. Furthermore, the user terminal inside the moving object follows the channel varying at high speed, and thereby needs to frequently perform channel estimation using a reference signal transmitted from the radio base station. Therefore, when each of a plurality of user terminals performs channel estimation independently, overhead is large due to transmission of the reference signal and feedback of channel state information (CSI), and system performance degrades.

Thus, an occurrence source of high-density traffic (communication amount) shifts with movement of the moving object including a plurality of user terminals. Therefore, in the radio base station on the periphery of the moving path of the moving object, a high load occurs when the moving object exists inside the cell (particularly, when the moving object enters the cell from the outside), and the load abruptly decreases when the moving object moves out of the cell. As a result, there is the risk that the network of the radio communication system is unstable.

Figure 2:
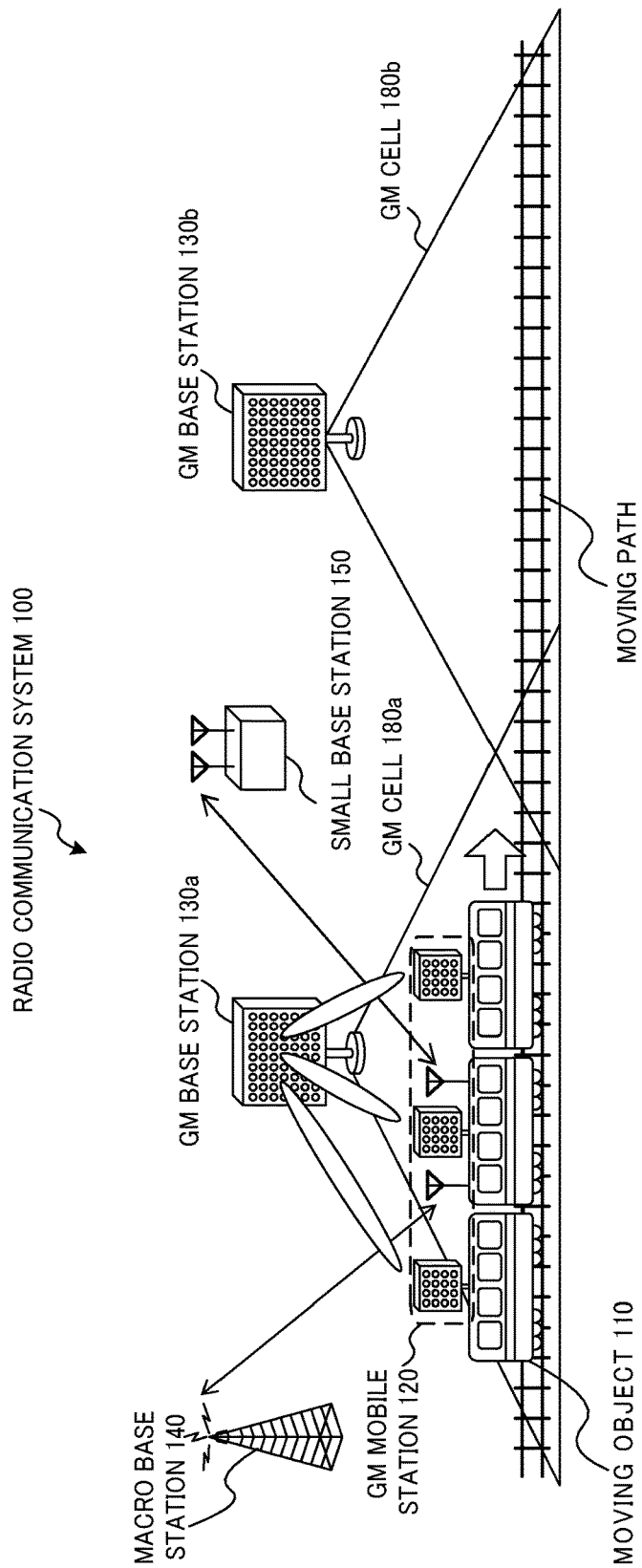
FIG. 2 is a schematic explanatory diagram of the radio communication system using group mobility.

Therefore, the inventors of the present invention considered providing a mobile station, which relays communications between a plurality of user terminals and a radio base station, in a moving object in group mobility to control communications between the mobile station (GM mobile station) and the radio base station (GM base station) (see FIG. 2). According to this configuration, it is possible to improve system performance of the entire radio communication system without adding any modification to the user terminal.

FIG. 2 is a schematic configuration diagram of a radio communication system using group mobility. For example, it is possible to apply an LTE system, LTE-A system, IMT-Advanced, 4G, FRA (Future Radio Access) and the like to the radio communication system 100 as shown in FIG. 2. In addition, the following description will be given using the case where a moving object is a train as an example, but this Embodiment is not limited thereto.

As shown in FIG. 2, the radio communication system 100 is comprised of a moving object 110 having a plurality of user terminals, GM mobile station 120 mounted on the moving object 110, GM base stations 130 (130a, 130b) for forming GM cells 180 (180a, 180b), macro base station 140 for forming a macrocell, and small base station 150 for forming a small cell.

The GM mobile station 120 is installed in the moving object 110, and relays communications between the user terminals included inside the moving object 110 and the GM base station 130, macro base station 140 and small base station 150. It is preferable that a transmission/reception antenna of the GM mobile station 120 is of a MIMO configuration having a plurality of antenna elements. By the configuration, using beam forming, it is possible to suitably follow a change in the relative position of each base station in association with movement of the moving object 110, and it is possible to ensure stable communication quality.

The GM base station 130 is a base station for forming a cell (GM cell) that covers a moving path of the moving object, and is installed along the moving path of the moving object 110. The GM base station 130 communicates with the user terminal via the GM mobile station 120 mounted on the moving object 110. It is preferable that a transmission/reception antenna of the GM base station 130 is of a MIMO configuration having a plurality of antenna elements. By the configuration, using beam forming, it is possible to suitably follow movement of the moving object 110, and it is possible to ensure stable communication quality and excellent resource usage efficiency.

The macro base station 140 is a radio base station for forming a cell (macrocell) that has relatively wide coverage, and is capable of communicating with the GM mobile station 120 and user terminal. In addition, the macro base station may be called eNodeB (eNB), radio base station, transmission point and the like.

The small base station 150 is a radio base station for forming a cell (small cell) that has local coverage, and is capable of communicating with the GM mobile station 120 and user terminal. In addition, the small base station may be called RRH (Remote Radio Head), pico-base station, femto-base station, Home eNodeB, transmission point, eNodeB (eNB) and the like. Further, the small base station 150 may be a Massive-MIMO base station capable of communicating by the Massive-MIMO transmission scheme.

The inventors of the present invention considered that the GM base station 130 uses a plurality of beforehand determined beam forming fixed weights (hereinafter, also described as "BF weights"), corresponding to the shape, width, moving direction and the like of the moving path of the GM mobile station 120 in the radio communication system 100 as shown in FIG. 2. More specifically, it is considered that the GM base station 130 switches a plurality of beforehand determined BF weights at certain intervals to select and forms a beam.

Figure 3:
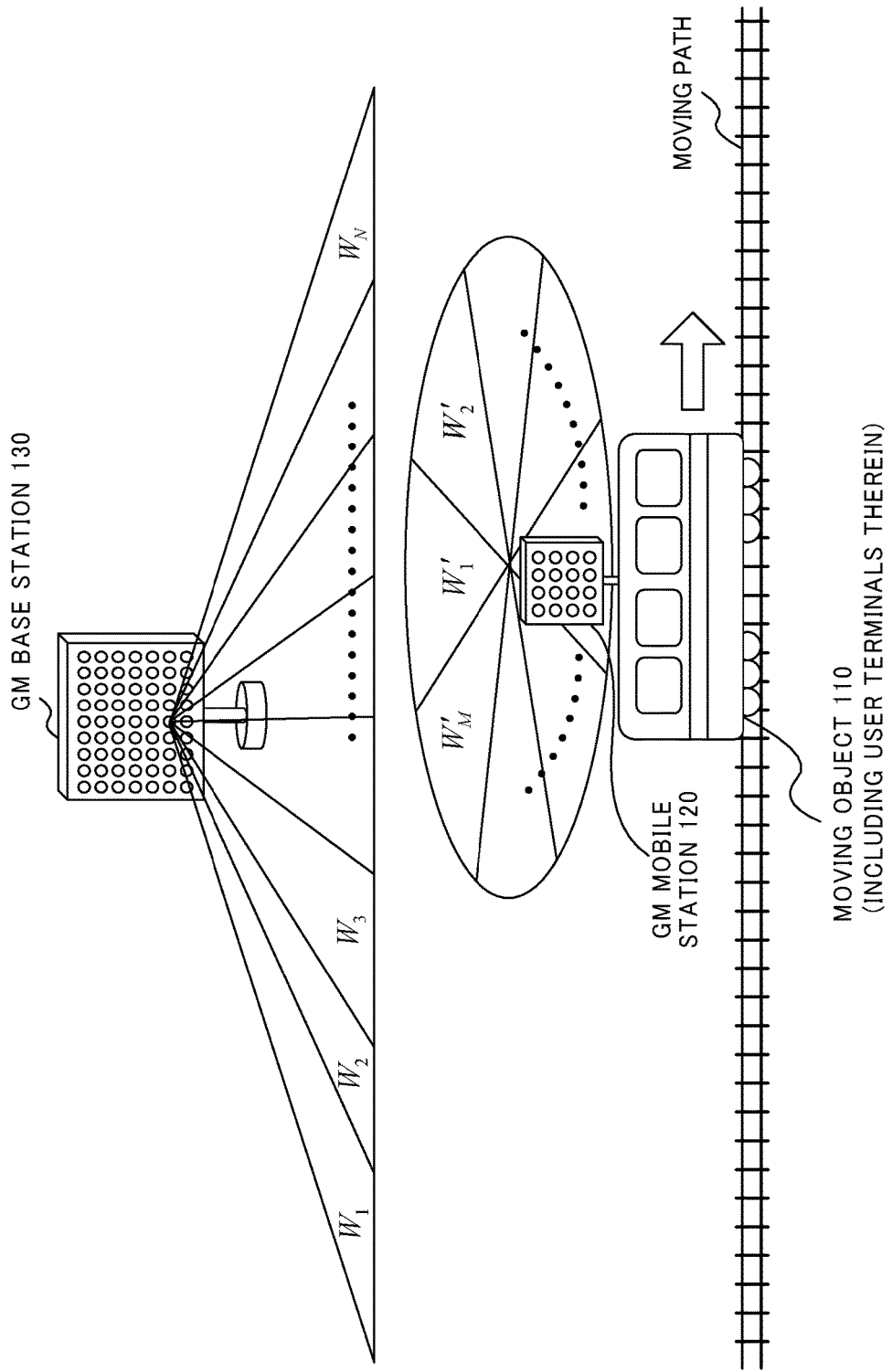
FIG. 3 is a diagram to explain one example of a communication method between a GM base station and a GM mobile station using predetermined fixed weights set along a moving path.

For example, as shown in FIG. 3, the case is assumed where the moving object 110 moves in the moving path from the left. In this case, the GM base station 130 grasps a position of the GM mobile station 120 mounted on the moving object 110, and forms a beam with a BF weight $W_1$. Subsequently, the base station executes update of the weight at predetermined time intervals, and while changing the weight as appropriate to BF weight $W_2$, $W_3$, . . . , $W_N$, executes communications with the GM mobile station 120.

In the method as shown in FIG. 3, when the moving object 110 moves according to a rule, the GM base station 130 is capable of specifying a geographic position in which the moving object 110 exists at the predetermined time, and is thereby capable of suitably performing beam forming by BF weight switching at certain time intervals.

On the other hand, the inventors of the present invention noted the respect that when the moving object 110 does not shift regularly, the BF weight that the GM base station 130 applies at some timing is not always the most suitable for the GM mobile station, and that in the case of requiring high throughput, it is difficult to use a plurality of beams for use in spatial multiplexing. Therefore, the inventors of the present invention conceived that the radio base station (GM radio base station 130) uses a signal for GM mobile station acquisition, and controls the BF weights corresponding to reception circumstances of the acquisition signal in the GM mobile station 120.

More specifically, the radio base station (GM base station) transmits a plurality of initial acquisition (IA) signals (hereinafter, also described as "acquisition signal" and "IA signal") applied with different BF weights respectively to at least an edge region (waiting scanning range) of the cell formed on the moving path of the moving object. Then, based on information (for example, information on the received IA signal) notified from the GM mobile station receiving a particular IA signal, the GM base station controls BF weights to apply to a data signal to transmit to the GM mobile station. By this means, even when the moving object 110 does not move regularly, it is possible to select proper BF weights in communications between the GM base station 130 and the mobile station 120.

The radio communication system according to this Embodiment will specifically be described below. The radio communication system according to this Embodiment is capable of being applied to radio communication systems (for example, FIG. 2) using group mobility.

Figures 4A, 4B:
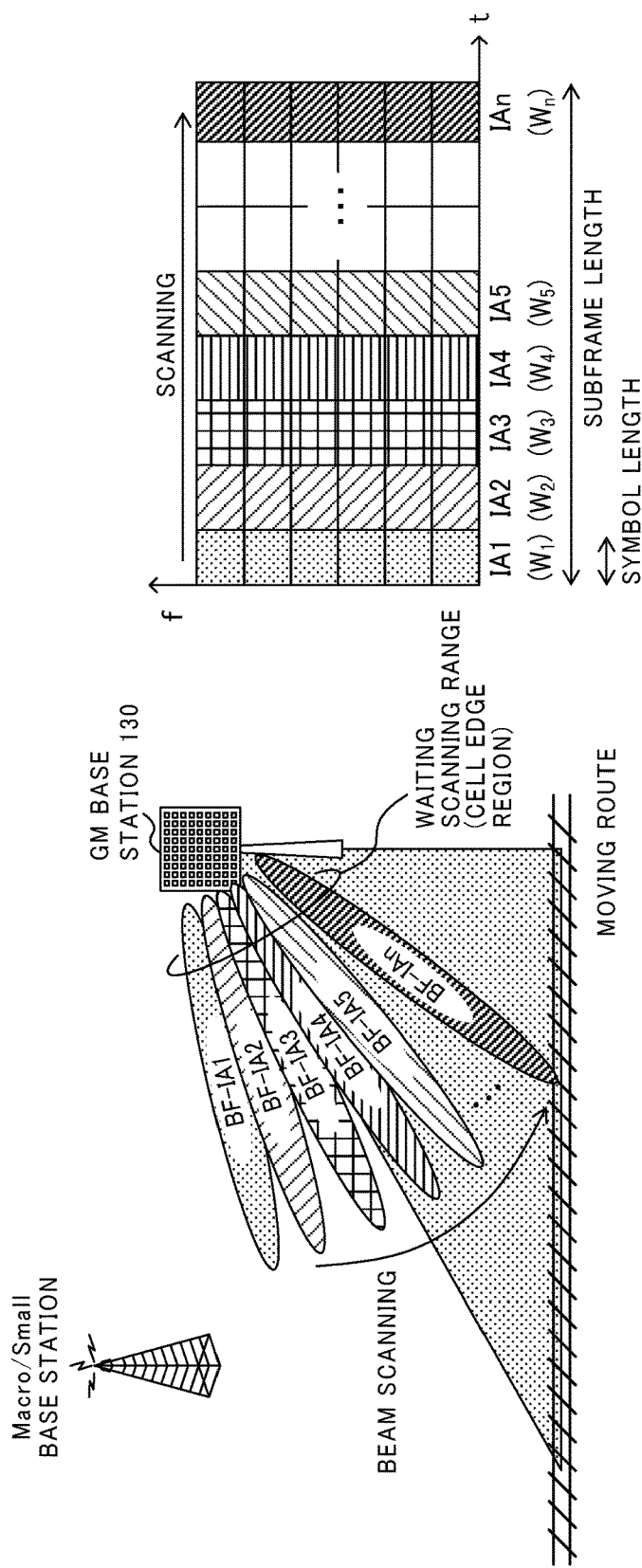
FIG. 4 contains diagrams to explain one example of a beam forming (BF) method of a GM base station according to this Embodiment.

The GM base station 130 forms the GM cell on the moving path of the moving object, and transmits a plurality of initial acquisition signals (IA signals) with different BF weights respectively applied thereto to a region (waiting scanning range) with a certain range including the edge of the cell (see FIG. 4). FIG. 4A shows the case where the GM base station 130 scans the cell edge region using n initial acquisition signals (BF-IA1 signal to BF-IAn signal).

Further, the GM base station 130 switches a plurality of IA signals for each predetermined period to multiplex in the time domain to transmit. For example, as shown in FIG. 4A, the GM base station 130 switches the IA signals with different BF weights respectively applied in the time domain for each time slot to transmit. Herein, the time slot indicates a predetermined time interval, and for example, it is possible to make one time slot one symbol. Herein, the case is shown where the IA1 signal to IAn signal are switched for each time slot (for example, one symbol) to transmit. In addition, FIG. 4 shows the case where the time slot is made the symbol, but this Embodiment is not limited thereto.

Furthermore, the GM base station 130 is capable of associating a plurality of IA signals with different BF weights applied respectively with predetermined time slots to transmit. For example, as shown in FIG. 4B, the station transmits the IA1 signal in the first time slot (first symbol) of a subframe, the IA2 signal in the second time slot, and the IAn signal in the nth time slot.

Still furthermore, the GM base station 130 applies the BF weight (fixed weight Wn) corresponding to the beam width and direction to each IA signal. At this point, the GM base station 130 is capable of forming beams using BF weights beforehand determined for a plurality of IA signals with a database and the like. In addition, it is possible to handle a switching interval of each beam, the number of beams, beam width and the like as system parameters. For example, it is possible to set a scanning time (or scanning period) of the beam as a subframe length, a beam switching interval as a symbol length, the number of beams as the number of symbols in a subframe, a beam width as (waiting range/the number of beams), and a beam angle interval as the beam width. Further, in the case of enhancing scanning accuracy, it is possible to set the scanning period at several times the subframe length, and to overlap beams, it is possible to set the angle interval of the beam at a few tenths of the beam width. Furthermore, in the example herein, two-dimensional (liner) scanning is described as an example, and the waiting scanning range may be a three-dimensional (surface-like) region, while scanning with the beam may be also performed in three dimensions.

The GM base station 130 may transmit the IA signal using the entire band of the frequency band to communicate (see FIG. 4B), or may transmit the IA signal while limiting to a part of the frequency band. For example, when the number of IA signals (the number of beams) to transmit to the cell edge region is larger than the number of predetermined time intervals (the number of slots), the GM base station 130 is capable of multiplexing a plurality of IA signals in the frequency domain to transmit.

In addition, it is considered that the case (detection mistake) occurs where the GM base station 130 is not able to detect the GM mobile station 120 in the edge region (waiting scanning range) of the GM cell. Accordingly, based on the detection mistake (failure rate) of the GM mobile station 120 in the waiting scanning range, the GM base station 130 is capable of controlling setting of parameters (parameters (BF weights and the like) of the fixed beam, usage band and the like) of the IA signal. In addition, even when the GM base station 130 makes the mistake of not detecting the GM mobile station 120 in the waiting scanning range, the station 130 may scan the entire GM cell using a plurality of IA signals for each predetermined period so as to subsequently detect the GM mobile station 120 inside the GM cell.

Further, the GM base station 130 is capable of making the IA signal a signal having a sequence specific to the GM base station. Furthermore, it is possible to configure the IA signal by combining (concatenating) a sequence (for example, synchronization signal (SS signal) in LTE/LTE-A) for system synchronization and a sequence (for example, reference signal (RS signal) for channel estimation in LTE/LTE-A) which is a reference signal for channel estimation and is known in the GM mobile station 120. By this means, the GM mobile station 120 is capable of achieving synchronization with the GM base station 130 and performing channel estimation using the received IA signal.

In addition, in the case where the need is eliminated for synchronization between the GM mobile station 120 and the GM base station 130 (for example, the case where the GM base station 130 is synchronized with a higher network (for example, macro base station)), the GM mobile station 120 is capable of acquiring an identification number (GM base station ID) of the GM base station from the higher network. In such a case, the GM base station 130 is capable of configuring the IA signal with only the sequence of the reference signal for channel estimation (without combining the sequence for synchronization).

Further, the sequence specific to the GM base station may be either of orthogonal signal/non-orthogonal signal. In the case of using a non-orthogonal signal, the IA signal may be orthogonal in the time domain. In the case of using an orthogonal sequence as the sequence for channel estimation, it is possible to perform spatial multiplexing on the IA signals, and to concurrently transmit a plurality of signals.

(Form of the GM Cell)

Installation forms of the GM cell formed on the moving path and waiting scanning range (cell edge region) will be described next with reference to FIGS. 5 and 6. An installation place of the GM base station 130 is preferably a place capable of widely covering the moving path of the moving object 110. For example, the GM base station 130 is installed beside the route (moving path) of the moving object 110 (see FIG. 5A), or above the route (see FIG. 5B).

In the case of providing the GM base station 130 beside the moving path of the moving object 110 (see FIG. 5A), the front direction (for example, center direction of an antenna pattern and the like) of antenna elements of the GM base station 130 is directed perpendicularly to the moving path. In the case of providing the GM base station 130 above the moving path of the moving object 110 (see FIG. 5B), the front direction of antenna elements of the GM base station 130 is provided in one direction or both directions along a traveling direction of the moving object 110. In addition, the antenna elements of the GM base station 130 may be tilted toward the travel direction. The specific installation form of the GM base station is determined as appropriate corresponding to the type of moving object, moving route, installation environment limitation of the GM base station and the like.

It is possible to set the range of the GM cell formed by the GM base station 130 as appropriate, corresponding to the configuration (the number of antennas, transmission power and the like) of the GM base station 130, GM cell interval, and the type of moving object 110 (train, car, bullet train, ship and the like). Further, the GM base station 130 sets a certain range including the cell edge direction (or entry direction of the moving object 110) at the waiting scanning range (cell edge region). The waiting scanning range (for example, angle range, direction and the like) set by the GM base station 130 is handled as system parameters. In addition, in consideration of travel directions of all moving objects 110, the GM base station 130 controls communications.

For example, the GM base station 130 sets a place in which the GM cell is discontinued on the moving path as the cell edge, and a surrounding region including the cell edge as the waiting scanning range (cell edge region) (see FIG. 6A). In addition, when GM cells formed by different GM base stations 130a, 130b overlap one another, it is possible to control setting of the cell edge region corresponding to the relationship between the GM base stations 130a, 130b.

For example, as shown in FIG. 6B, the case is assumed where the GM cell 1 formed by the GM base station 130a overlaps a part of the GM cell 2 formed by the GM base station 130b. In the case where the GM base station 130a (GM cell 1) and adjacent GM base station 130b (GM cell 2) are capable of being in cooperation with each other for control signals and the like, and the GM mobile station 120 is capable of continuously shifting and connecting from the GM cell 1 to the adjacent GM cell 2, it is not necessary to set the waiting scanning range (cell edge region) on the region where the GM cell 1 and GM cell 2 overlap one another. The case where the GM cells 1 and 2 are formed by a single GM base station 130 is the same as the foregoing. In addition, as cooperation between the GM cell 1 and the GM cell 2, signals may be directly communicated between the GM base stations, or may be communicated via a higher network such as the macro base station.

On the other hand, even when the GM cell 1 and GM cell 2 overlap one another, in the case where the GM cell 1 and GM cell 2 are not in cooperation for control signals and the like and communications are disconnected (it is not possible to continuously connect) when the GM mobile station 120 shifts from the GM cell 1 to the GM cell 2, the waiting scanning range (cell edge region) is also set in the overlapping region of the GM cell 1 and GM cell 2. Thus, the GM mobile station 130 sets the end portion of the GM cell formed on the moving path as the waiting scanning range (cell edge region), and is capable of detecting the GM mobile station 120 by transmitting a plurality of IA signals to the waiting scanning range (cell edge region).

(IA Signal Reception Operation in the GM Mobile Station)

Figure 7:
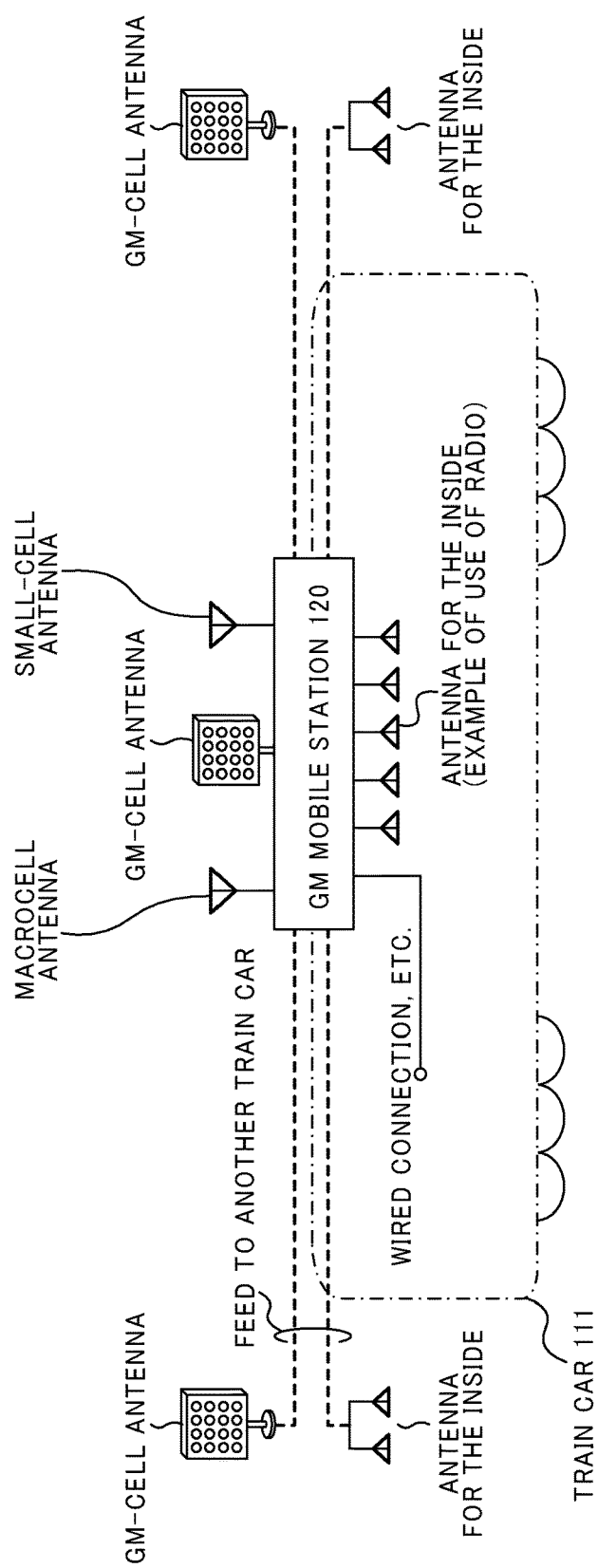
FIG. 7 is a schematic explanatory diagram of a GM mobile station according to this Embodiment.

Described next is operation of the GM mobile station receiving the IA signal transmitted from the GM base station. First, referring to FIG. 7, a basic configuration of the GM mobile station according to this Embodiment will be described. FIG. 7 is a schematic explanatory diagram of the GM mobile station according to this Embodiment, and illustrates the case where the GM mobile station 120 is disposed in a single train car 111 in the moving object as an example.

The GM mobile station 120 has a plurality of antenna elements for GM cells to constitute MIMO. Further, by distributing the number of antenna elements for GM cells in the moving object to arrange, it is possible to obtain a spatial multiplexing effect by distributed antenna MIMO, and to suitably perform handover between GM cells. In addition, when priority is given to cost reduction according to the arrangement and wiring of antenna elements, antenna elements may be concentrated and arranged. Further, different GM mobile stations 120 may be provided for each train car.

Further, the GM mobile station 120 is equipped with antennas and transmitters/receivers for macrocell and small cell, and relays signals of the macrocell and small cell to the inside of the moving object. By this means, concurrently with ensuring stability of connection according to communications of user terminals, the GM mobile station 120 is capable of controlling communications between each of the macrocell and small cell and a plurality of user terminals. As a result, as compared with the case where each user terminal communicates with each cell individually, it is possible to reduce communication overhead of control signals, reference signals and the like required for the macrocell and small cell.

As a relay method of signals to user terminals and signals from user terminals in the GM mobile station 120, it is possible to use a DF (Decode and Forward) type relay technique and AF (Amplify and Forward) type relay technique. In addition, the relay method of signals is not limited thereto.

Figures 8A, 8B:
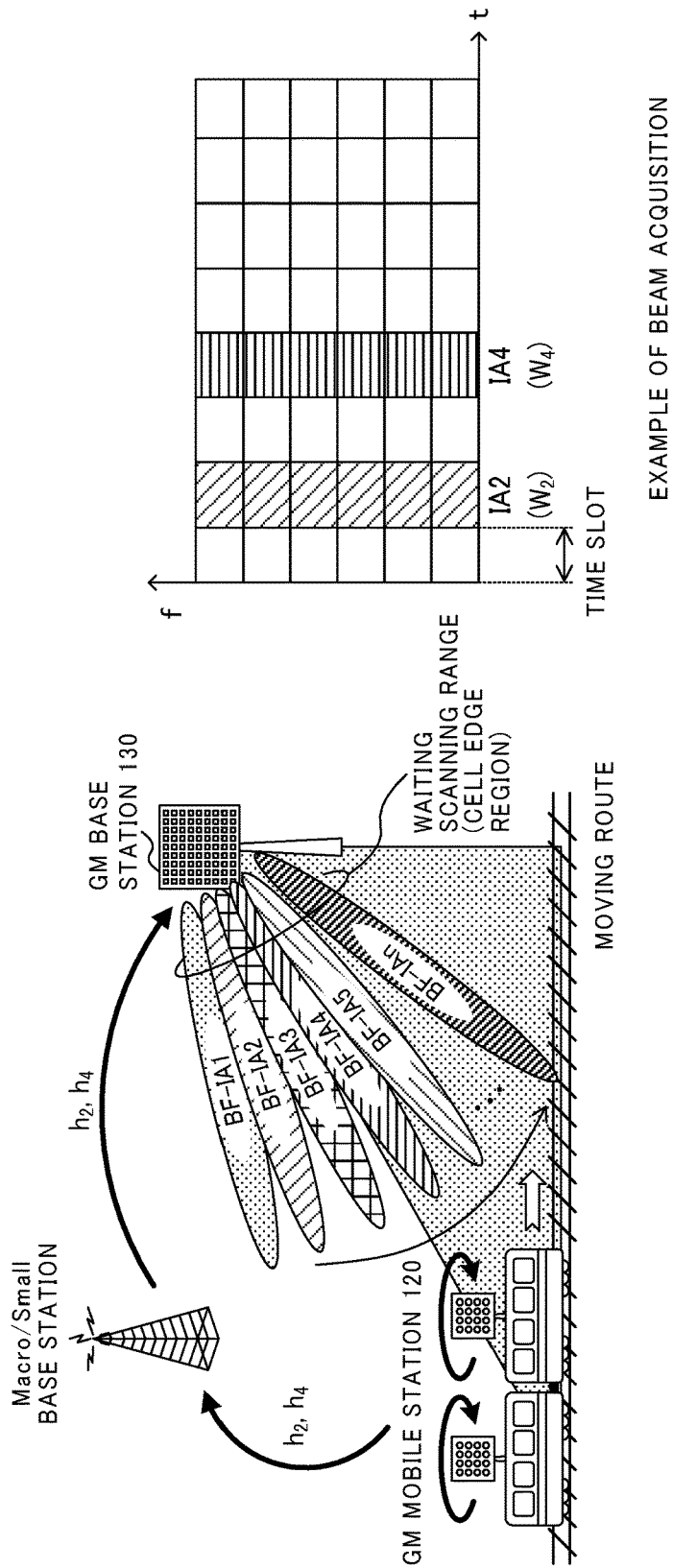
FIG. 8 contains explanatory diagrams of communication operation of the GM base station and GM mobile station in the cell edge region.

Referring to FIG. 8, described next is operation when the GM mobile station 120 receives the IA signal in the cell edge region (waiting scanning range). In addition, in FIG. 8, the case is shown where the GM Mobile station 120 receives IA2 signal ($W_2$) and IA4 signal ($W_4$) in the cell edge region (waiting scanning range) among a plurality of IA signals transmitted from the GM base station 130 (see FIG. 8B). The BF weight $W_2$ is applied to the IA2 signal, and the BF weight $W_4$ is applied to the IA4 signal.

As shown in FIG. 8A, the GM mobile station 120 shifts, while receiving the IA signal transmitted from the GM base station 130. At this point, the GM mobile station 120 may receive the IA signal, without performing beam forming (BF), or when the station is capable of specifying the direction of arrival of the IA signal and the like with assist information form the higher network such as the macro base station, the station may perform BF in a certain range to receive the IA signal. When the GM mobile station 120 performs BF to receive, the station is capable of determining parameters of the reception range, beam width, the presence or absence of beam switching, beam switching method and the like as appropriate from the assist information received from the outside (for example, macro base station or small base station).

Using the received IA signal, the GM mobile station 120 specifies the GM base station 130, and executes frequency and timing synchronization and the like. Further, the station 120 transmits information (beam identification number, channel estimation result and the like) on the received IA signal, and information on the GM mobile station. The GM mobile station 120 is capable of transmitting (as feedback) the information on the IA signal and the information on the GM mobile station to the GM base station 130 via the macro base station and/or small base station.

Further, when the GM mobile station 120 is synchronized with the macro base station (macrocell), the GM mobile station 120 is capable of grasping frame timing of the GM base station 130, and is thereby capable of specifying each time slot that the GM base station 130 applies. Accordingly, when IA signals with particular BF weights applied are respectively associated with time slots, the GM mobile station 120 is capable of specifying the received IA signal (identification number of the IA signal) based on the time slot number.

Furthermore, as the information on the GM mobile station, there are the identification number (GM mobile station ID) of the GM mobile station, GM mobile station configuration (the total number of GM mobile stations, installation interval, HW configuration and the like), moving object information (type, configuration and the like), moving conditions (direction, speed and the like) of the moving object, position information, traffic amount and the like. In addition, the GM mobile station 120 is capable of transmitting the information on the GM mobile station to the higher network (macro base station and the like) for each predetermined period. In this case, it is also possible to transmit only updated information for each predetermined period.

Still furthermore, when the GM mobile station 120 receives a plurality of IA signals, the station may return information on all of the received IA signals, or may return information on a part of the IA signals. When the GM mobile station 120 returns the information on a part of the IA signals among a plurality of received IA signals, the station may select IA signals of a predetermined reference value or more (for example, the channel estimation result is a predetermined value or more) to return.

(Data Signal Transmission Operation of the GM Base Station)

Based on the information notified from the GM mobile station 120 receiving the IA signal, the GM base station 130 controls the BF weight applied to a data signal to transmit to the GM mobile station 120. More specifically, the GM base station 130 applies the BF weight of the IA signal received (acquired) by the GM mobile station 120 to a data signal to transmit (see FIGS. 9A, 9B).

In addition, the data signal described herein indicates a part or the whole of DL signals except the IA signal. For example, the GM base station 130 applies the BF weight of the IA signal acquired by the GM mobile station 120 to user data (for example, PDSCH signal and the like in LTE, LTE-A) and/or control signal (for example, PDCCH signal and the like in LTE, LTE-A).

Further, the GM base station 130 continues to transmit the IA signal received by the GM mobile station 120. In this case, the GM base station 130 transmits the IA signal in the same time slot as the time slot in which the IA signal is transmitted to the cell edge region, and transmits the data signal in another time slot (time slot in which another IA signal is transmitted).

Furthermore, the GM base station 130 predicts an IA signal that the moving GM mobile station 120 next receives (acquires) from the moving speed and direction of the moving object 110 (GM mobile station 120), and also transmits the predicted IA signal (prediction beam). More specifically, the GM base station 130 predicts a position of the GM mobile station 120 after a lapse of predetermined time, from the moving speed, direction and route shape, and selects an IA signal corresponding to the predicted direction as the prediction beam. At this point, as the prediction beam, the GM base station 130 is capable of selecting a plurality of beams (a plurality of IA signals with different BF weights applied) within a certain range including the predicted direction.

FIG. 9 shows one example of IA signals and data signals that the GM base station 130 transmits when the GM mobile station 120 receives (acquires) the IA2 signal ($W_2$) among a plurality of IA signals transmitted in the cell edge region.

Figures 9A, 9B:
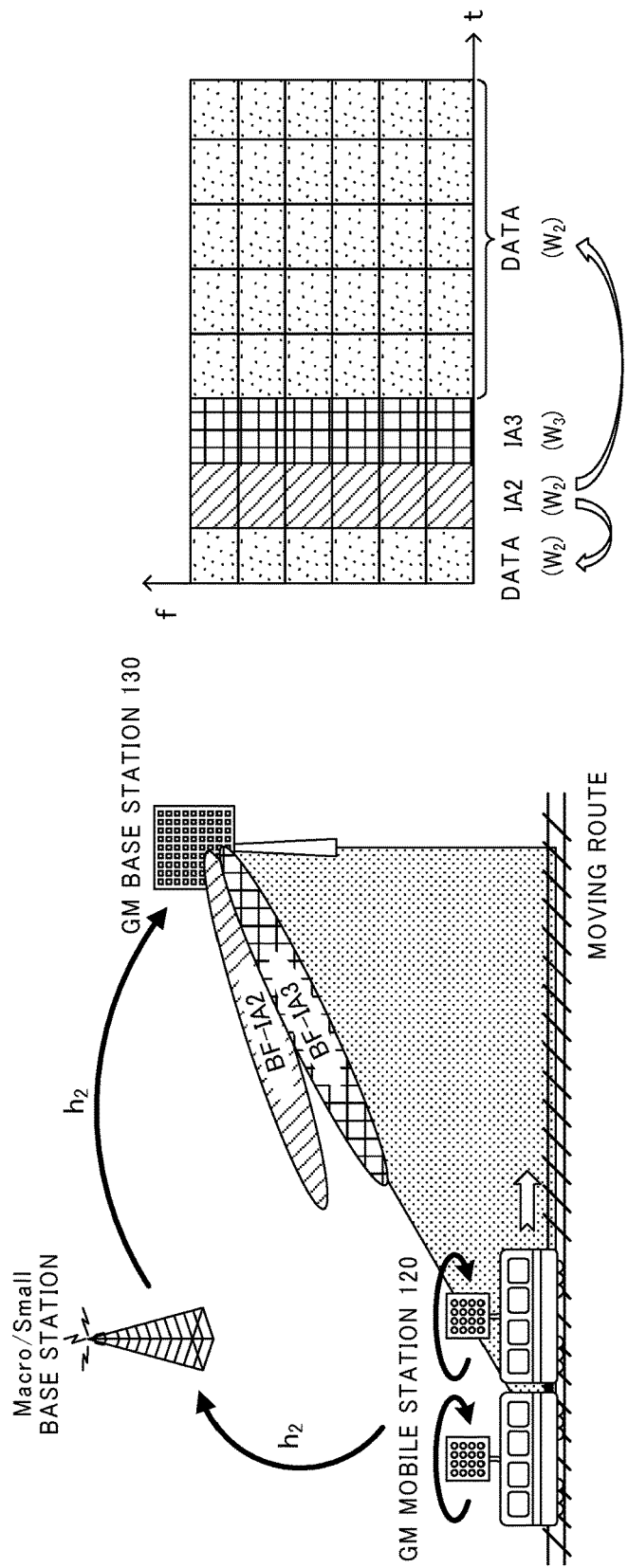
FIG. 9 contains explanatory diagrams of communication operation of the GM base station and GM mobile station in the cell edge region (when the GM mobile station acquires one beam)

In this case, the GM base station 130 acquires the information on the IA2 signal and the information on the GM mobile station 120 returned from the GM mobile station 120 via the macro base station and the like (see FIG. 9A). Then, the GM base station 130 applies the BF weight $W_2$ applied to the IA2 signal also to the data signal to transmit. Further, based on the information about the GM mobile station and the like, the GM base station 130 predicts the IA3 signal as the prediction beam, and transmits the IA2 signal and IA3 signal in predetermined time slots (time slots associated in the cell edge region) (see FIG. 9B). At this point, the GM base station 130 transmits the data signals in different time slots from those of the IA2 signal and IA3 signal.

For selection of the prediction beam in the GM base station 130, in addition to the information returned from the GM mobile station 120, it is possible to store past results as a database (DB) to use.

Figure 10B:
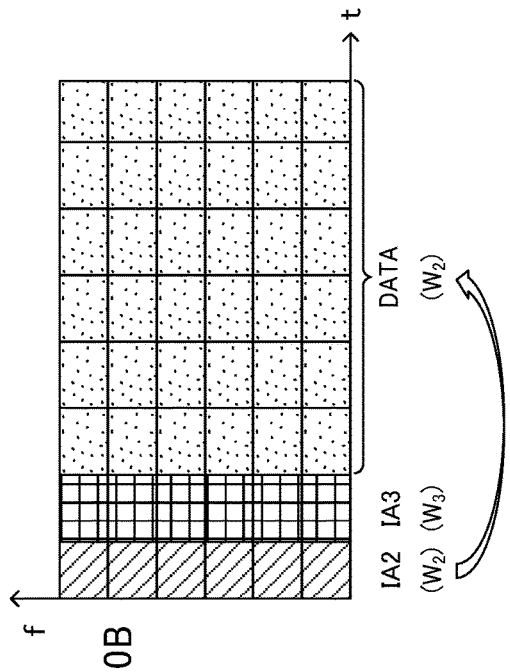
FIG. 10 contains explanatory diagrams of communication operation of the GM base station and GM mobile station in the cell edge region (when the GM mobile station acquires one beam)
Figure 10C:
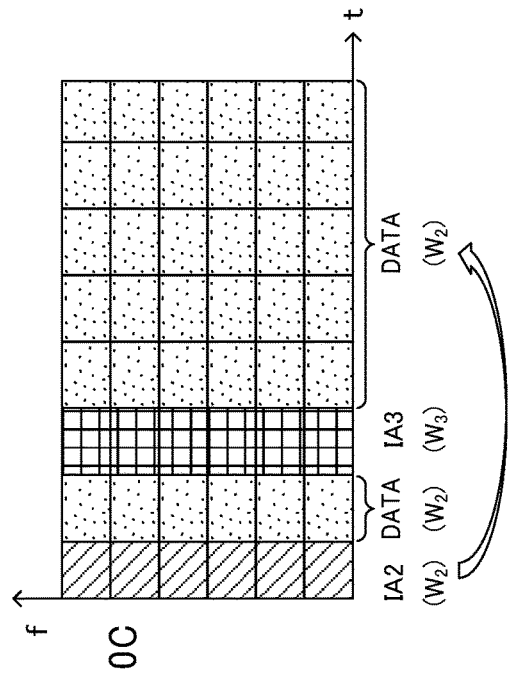
Figure 10A:
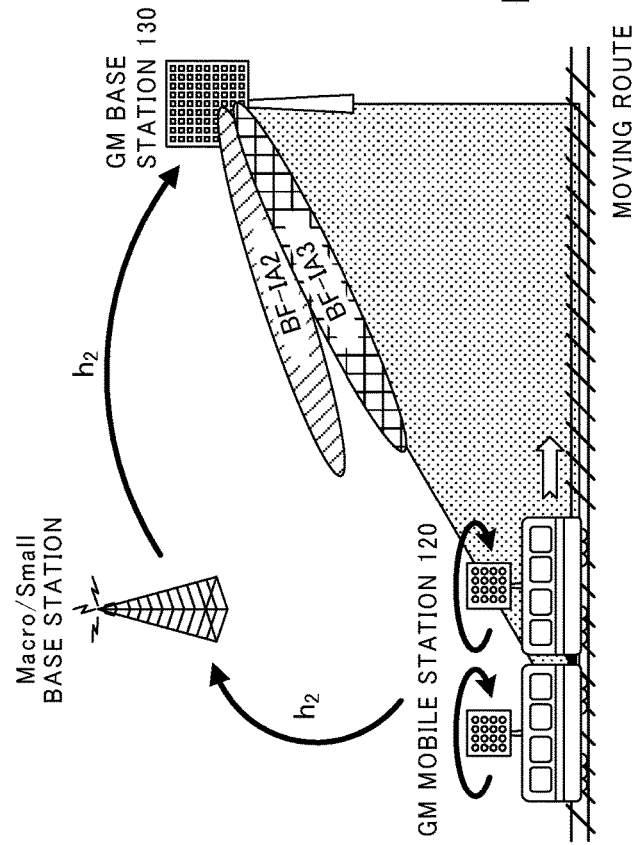

In addition, FIG. 9 shows the case where the GM base station 130 transmits the IA2 signal (IA signal for a data signal used in the data signal) acquired by the GM mobile station 120 and the IA3 signal for prediction in the same time slots as the time slots transmitted in the cell edge region, but the present invention is not limited thereto. For example, it may be configured that the IA2 signal acquired by the GM mobile station 120 is transmitted in a beginning time slot (for example, the first symbol of the subframe) (see FIGS. 10A to 10C). At this point, the IA3 signal for prediction may be transmitted in the next time slot of the IA2 signal (see FIG. 10B), or may be transmitted in the same time slot as the time slot transmitted in the cell edge region (see FIG. 10C). In addition, in both of the cases of FIGS. 10B and 10C, it is possible to transmit data signals in time slots except the time slots in which the IA2 signal and IA3 signal are transmitted.

Further, as shown in FIG. 23A, when the GM mobile station 120 is positioned near the edge of the GM cell, there is the case where a beam for prediction (IAm signal for prediction in FIG. 23A) toward outside the waiting scanning range is calculated. In such a case, the beam for prediction (IAm signal) is not held in time slots of the initial frame (see FIG. 23B). Accordingly, in this case, time slots are reconfigured so that the IA signal (IAn signal in FIG. 23A) for a data signal is positioned at the beginning of the frame (or subframe) (see FIG. 23C).

Information (TS reconfiguration information) on time slot reconfiguration is notified from the GM base station 130 to the GM mobile station 120. At this point, the GM base station 130 is capable of notifying the GM mobile station 120 of the information on time slot reconfiguration via the macro base station and small base station. Further, subsequently thereto, when the IA signal for prediction is positioned outside the frame, it is possible to perform the same processing (processing for arranging the IA signal for a data signal at the beginning of the frame). In addition, in the case of using the method of arranging the IA signal for a data signal at the beginning of the frame (for example, FIG. 10), the need is eliminated for the processing shown in FIG. 23.

In the case where the GM mobile station 120 returns the information on a plurality of IA signals to the GM base station 130, the station selects a combination of predetermined IA signals, and applies BF weights of the selected IA signals respectively to data signals to transmit in a plurality of layers. Further, separately from the selected IA signals for the data signal, the station selects an IA signal for prediction to transmit in a predetermined time slot. Furthermore, the GM base station 130 is capable of transmitting the IA signal for a data signal and the IA signal for prediction in the same time slots as the time slots transmitted in the cell edge region, and of spatially multiplexing data signals in the remaining time slots to transmit.

For example, the GM base station 130 synthesizes a MIMO channel matrix H from respective channel estimation results (h) of a plurality of IA signals returned from the GM mobile station 120, and determines a combination of beams (IA signals) such that the capacity of channels is maximum. For example, when the GM base station 130 transmits signals with BF applied, and the GM mobile station 120 (the number of antennas is Nr) receives without applying BF, the GM base station 130 is capable of synthesizing a channel matrix H (matrix of size Nr×N) using respective channels hn (vector of size Nr×1) of N beams (see Equation (1)).

$$hn = (h_{1n}, h_{2n}, \ldots, h_{Nr,n})T$$

$$H = (h_1, h_2, \ldots, h_N) \qquad \text{Equation (1)}$$

Further, the GM base station 130 may determine a combination of IA signals, in consideration of balance of the network, interference to adjacent cells and the like. Furthermore, the combination of IA signals may be determined in the GM base station 130, or may be determined in the GM mobile station 120 or higher control node. Information on the determined combination of IA signals is notified to at least the GM base station 130 and the GM mobile station 120.

FIG. 11A shows the case where the GM mobile station 120 receives the IA2 signal and IA5 signal, and returns information (identification number of the IA signal, channel estimation result and the like) on the IA2 signal and IA5 signal to the GM base station 130. Herein, the case is shown where the IA2 signal and IA5 signal are selected as the combination of IA signals, and the IA3 signal and IA6 signal are selected as the IA signal for prediction.

In this case, the GM base station 130 performs MIMO transmission on the selected IA2 signal and IA5 signal for the data signal and IA3 signal and IA6 signal for prediction respectively in the same time slots as the time slots transmitted in the cell edge region (see FIG. 11B). More specifically, the station transmits the IA2 signal ($W_2$) and IA3 signal ($W_3$) in a layer 1, and the IA5 signal ($W_5$) and IA6 signal ($W_6$) in a layer 2. Further, the GM base station 130 performs spatial multiplexing on data signals in time slots in which the IA signal is not transmitted to transmit. More specifically, the station transmits the data signal to which the BF weight $W_2$ is applied in the layer 1, and further transmits the data signal to which the BF weight $W_5$ is applied in the layer 2.

In addition, FIG. 11 shows the case of transmitting the IA2 signal and IA5 signal for the data signal and IA3 signal and IA6 signal for prediction in the same time slots as the time slots transmitted in the cell edge region, but the present invention is not limited thereto.

For example, as shown in FIG. 12A, IA signals are transmitted sequentially starting with the beginning of time slots, and data signals are subjected to spatial multiplexing in the remaining time slots and are transmitted. Alternatively, as shown in FIGS. 12B and 12C, it is possible to transmit the IA2 signal and IA5 signal for the data signal in parts of the frequency band, and the IA3 signal and IA6 signal for prediction in the entire frequency band.

At this point, the GM base station 130 may multiplex the IA2 signal and IA5 signal in the frequency domain to transmit. In addition, FIG. 12B shows the case of successively assigning the IA2 signal and IA5 signal respectively to a part of the frequency domain, and FIG. 12C shows the case of distributing and assigning the IA2 signal and IA5 signal to a plurality of frequency domains respectively. In addition, the method of assigning the IA signal for a data signal and IA signal for prediction is not limited thereto, and it is possible to combine FIG. 11B and FIGS. 12A to 12C as appropriate to set.

(DL/UL Transmission/Reception)

Figure 13:
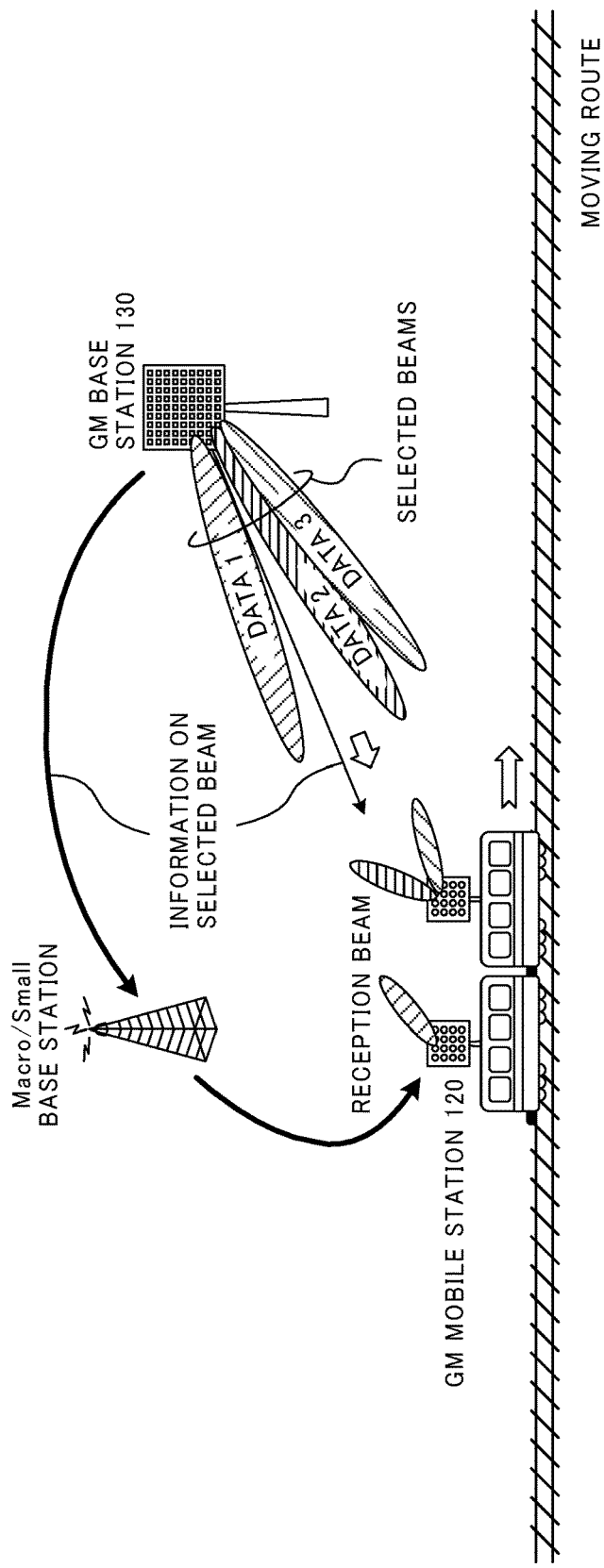
FIG. 13 is an explanatory diagram of operation in receiving DL data in the GM mobile station.

FIG. 13 shows a schematic diagram when the GM mobile station 120 receives a data signal transmitted from the GM base station 130. The GM base station 130 notifies the GM mobile station 120 of information on a beam to transmit a data signal. For example, the GM base station 130 transmits the information (identification number of the IA signal, position of the transmitted time slot and the like) on the IA signal for a data signal and IA signal for prediction to the GM mobile station 120 directly or via the macro base station and small base station.

By referring to the notified information, the GM mobile station 120 synthesizes the MIMO channel matrix H as in the GM base station 130 from a channel estimation result corresponding to the beam (IA signal) selected in the GM base station 130, and using H, generates a proper reception weight to receive the data signal. By this means, the GM mobile station 120 is capable of properly receiving the data signal in accordance with transmission BF and radio channel. In addition, when it is possible to feed antennas to a plurality of train cars to provide in the GM mobile station 120, the station is capable of generating reception weights collectively in all the antennas to receive the data signal.

Figure 14:
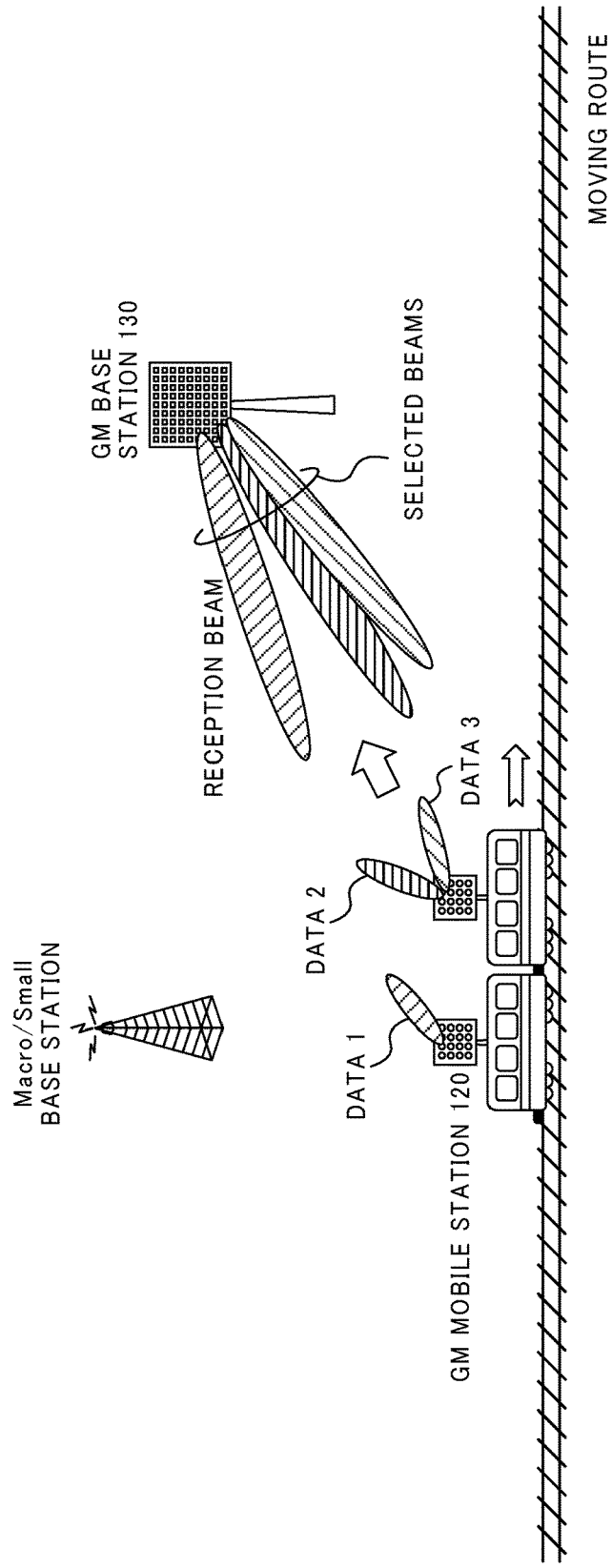
FIG. 14 is an explanatory diagram of operation in receiving UL data in the GM base station.

Further, as an example, FIG. 14 shows a schematic diagram of the case where the GM mobile station 120 transmits an UL signal at the same frequency as DL to the GM base station 130 (the case of using TDD). The GM mobile station 120 applies the BF weight (BF weight applied to the data signal) received in DL as a transmission weight in UL and is capable of transmitting data. In this case, the GM base station 130 receives UL data using the BF weight of the fixed beam used (selected) in DL transmission as a reception weight of the UL signal. In addition, in this case, when there is a difference in characteristics caused by hardware and the like of transmitter/receiver, a correction is made as necessary.

Furthermore, each of the GM base station 130 and GM mobile station 120 is capable of repeatedly performing transmission/reception of data using the same beam (BF weight) within a certain time. In the case where a shift variation inside a subframe of the GM system is smaller than a single beam range due to the moving speed of the moving object and the like, it is possible to use the same beam within a time of a plurality of subframes. At this point, also for the IA signal for prediction transmitted from the GM base station 130, the GM mobile station 120 performs reception in a predetermined time slot. The GM mobile station 120 is capable of acquiring the information on the time slot to which the IA signal for prediction is assigned from the GM base station 130 directly or via the macro base station and the like. In addition, when the time slot is not changed, the GM mobile station 120 may calculate a time slot assigned to the IA signal for prediction based on the already received time slot configuration.

(Beam Switching Operation)

Figure 15:
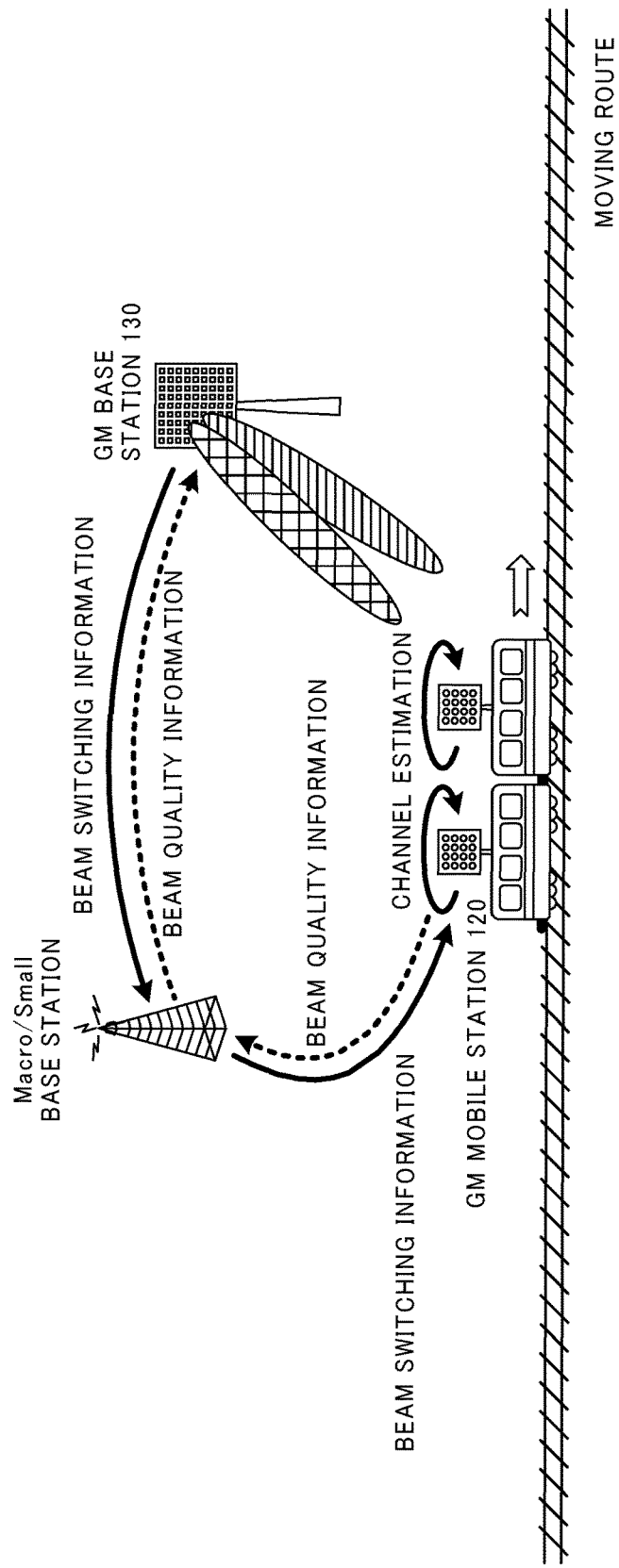
FIG. 15 is an explanatory diagram of switching operation of beams (IA signals) in the GM base station.

In association with movement of the moving object 110, when the quality of the IA signal for prediction received in the GM mobile station 120 is higher than that of the selected IA signal for the data signal, the GM mobile station 120 notifies the GM base station 130 of the beam quality information (see FIG. 15). Alternatively, when the quality of the IA signal for the data signal is decreased to a predetermined reference value or less, the GM mobile station 120 notifies the GM base station 130 of the beam quality information. In other words, when the beam quality for the data signal is decreased in association with movement, the GM mobile station 120 is capable of notifying the GM base station 130 of a beam change request. Further, concurrently with notification of the beam change request, the station transmits also channel information estimated from the IA signal for prediction to the GM base station 130 together with the notification.

Based on the beam quality information (beam change request, channel information and the like) notified from the GM mobile station 120, the GM base station 130 applies the BF weight of the IA signal for prediction to the data signal to transmit. Then, the station selects an IA signal having the possibility that the GM mobile station 120 next receives as the IA signal for prediction. In addition, as shown in FIG. 11, in the case of multiplexing to transmit by MIMO transmission, the station calculates again the presence or absence of multiplexing and the combination of beams (IA signals) to multiplex. The station is capable of notifying the GM mobile station 120 of the information on beam switching via the macro base station and small base station.

In addition, the GM base station 130 performs changing of the IA signal to apply to the data signal and resetting of the IA signal for prediction repeatedly until the GM mobile station 120 next passes through the cell edge (cell edge in the opposite direction). By this means, even when the moving object 110 (GM mobile station 120) does regularly not move, the GM base station 130 is capable of selecting proper BF weights to apply to the data signal.

For the GM mobile station 120 that is transmitting and receiving data, the GM base station 130 may perform beam scanning within a certain range including the prediction beam (IA signal for prediction) at timing of beam switching. At this point, it is preferable that the GM mobile station 120 executes channel estimation again and returns the channel estimation result to the GM base station 130. By this means, the GM base station 130 is capable of resetting an optimal transmission beam. In addition, the range to perform beam scanning and the interval of resetting in the GM base station 130 are determined in consideration of the speed, direction and the like of the GM mobile station 120.

(Processing Flow)

Figure 16:
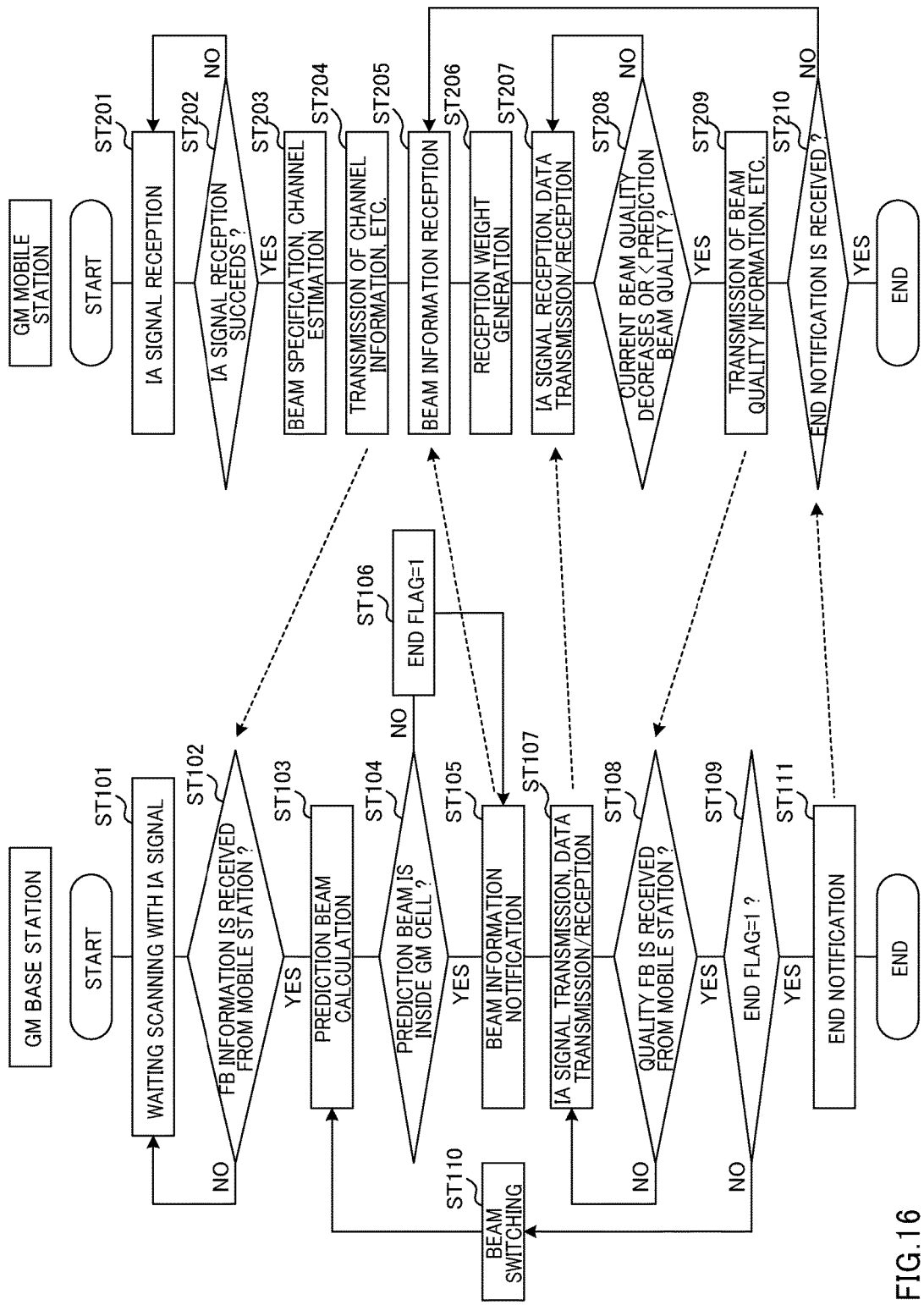
FIG. 16 is one example of a flowchart of communication operation of the GM base station and GM mobile station.

FIG. 16 shows one example of a flowchart according to a communication method of the GM base station and the GM mobile station in this Embodiment.

Described first is a procedure of the GM base station. The GM base station transmits a plurality of IA signals with different BF weights applied to an edge region (waiting scanning range) of the cell formed on a moving path of a moving object (step ST101). Next, in the case of receiving feedback (FB) information from the GM mobile station receiving the IA signal (Yes in step ST102), the station calculates (selects) a prediction beam (IA signal for prediction) (step ST103). As the information transmitted from the GM mobile station as feedback, there is the information (identifier of the IA signal, channel estimation result and the like) on the IA signal received in the GM mobile station, and the information on the GM mobile station.

In the case of directing the prediction beam toward inside the GM cell formed by the GM base station (Yes in step ST104), the station notifies the GM mobile station of the information on the IA signal for a data signal and the IA signal for prediction (step ST105). On the other hand, in the case of directing the prediction beam toward outside the GM cell formed by the GM base station (No in step ST104), the station sets an end flag (for example, end flag=1) (step ST106). Subsequently, the station notifies the GM mobile station of the information on the IA signal for a data signal.

Next, the GM base station transmits the data signal with a predetermined BF weight applied, IA signal for a data signal, and IA signal for prediction, while receiving an UL signal transmitted from the GM mobile station (step ST107).

In the case of receiving notification (beam change request) concerning quality of the beam from the GM mobile station (Yes in step ST108), the GM base station judges whether or not to switch to a prediction beam (IA signal for prediction) (step ST109). In the case where the prediction beam is set inside the GM cell (the case where the end flag of step ST106 is not set), the GM base station switches the IA signal for prediction to the IA signal for data transmission (step ST110). Then, the station applies a weight of the new IA signal for data transmission to the data signal, and newly sets an IA signal for prediction. On the other hand, in the case where the prediction beam is not set inside the GM cell (the case where the end flag of 1 in step ST106 is set), the station finishes transmission of the data signal, and notifies the GM mobile station of the finish (step ST111).

Described next is a procedure of the GM mobile station. First, the GM mobile station tries to receive the IA signal transmitted from the GM base station (step ST201). In the case of receiving the IA signal (Yes in step ST202), the station specifies the received IA signal, and performs channel estimation (step ST203). In addition, as described above, when each IA signal is associated with a predetermined time slot, the GM mobile station is capable of specifying the IA signal from the time slot in which the received IA signal is transmitted.

Then, the GM mobile station transmits the information (identification number of the IA signal, channel estimation result and the like) on the received IA signal, the information on the GM mobile station and the like as feedback (step ST204). In addition, it is possible to transmit these pieces of information to the GM base station as feedback via the macro base station and the small base station.

Next, the GM mobile station receives the information on the IA signal for a data signal selected in the GM base station and the information (beam information) on the IA signal for prediction (step ST205). The GM mobile station generates a reception weight based on the received beam information (step ST206), receives the IA signal and data signal transmitted from the GM base station, and performs transmission of the UL signal (step ST207).

Then, the GM mobile station judges about the quality of the beam (IA signal) applied by the GM base station (step ST208). In the case where the beam quality of the IA signal for prediction in the GM mobile station is higher than that of the IA signal for the data signal, the GM mobile station notifies the GM base station of the beam quality information (beam change request) (step ST209). Further, in the case of receiving notification of data transmission/reception end from the GM base station, the station finishes data transmission/reception to/from the GM base station (step ST210).

(Initial Connection Operation of the GM Mobile Station and GM Base Station)

Referring to FIG. 21, one example will specifically be described for initial connection operation (steps ST101 and ST102 and steps ST201 to ST204 in FIG. 16) of the GM mobile station 120 and GM base station 130 according to this Embodiment. In addition, the following description is not limited to initial connection (cell search) operation of the GM mobile station 120 and GM base station 130 in the waiting scanning range. For example, when the GM base station 130 takes the mistake of not detecting the GM mobile station 120 in the waiting scanning range, it is possible to apply also to the case of detecting the GM mobile station 120 inside the GM cell subsequently. Further, connection operation applicable in this Embodiment is not limited to the method described below.

As described above, as the IA signal to apply to initial connection operation with the GM mobile station 120, the GM base station 130 applies a plurality of transmission beams with different fixed weights applied. In other words, the GM base station 130 applies beam forming to the IA signal, and generates a plurality of beams with narrow beam widths to transmit. Further, the GM base station 130 includes respective identification information (for example, beam ID) in the IA signals with different weights applied to transmit.

Figure 21B:
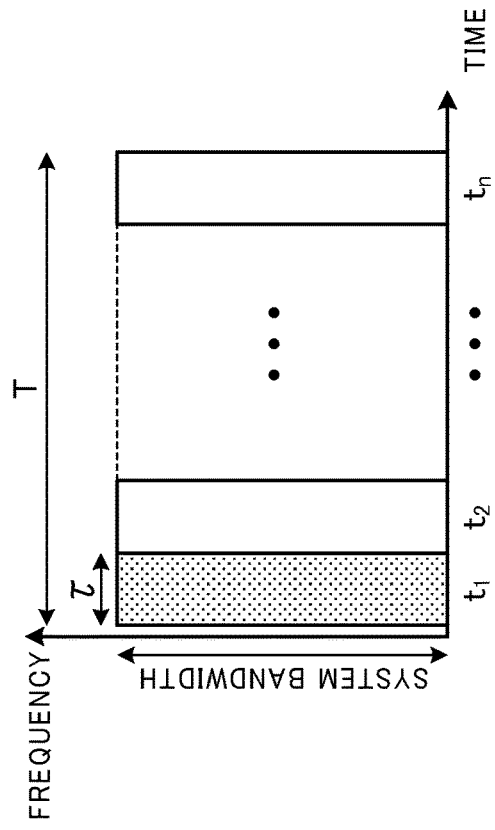
FIG. 21 contains explanatory diagrams of initial connection operation of the GM mobile station and GM base station.
Figure 21A:
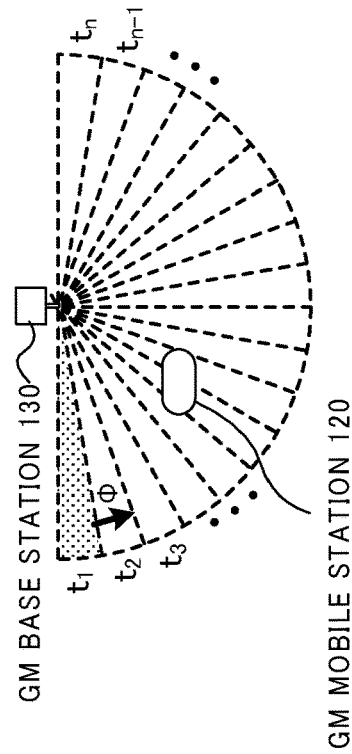

FIG. 21A schematically illustrates a transmission image of IA signals transmitted from the GM base station 130. FIG. 21B illustrates the IA signals transmitted from the GM base station 130 on the time axis and frequency axis. As shown in FIG. 21A, the GM base station 130 changes the transmission beam with a narrow beam width in a predetermined azimuth angle direction at time intervals τ, and is thereby capable of transmitting the IA signal with BF applied to a part (for example, cell edge region) of the GM cell or the entire GM cell in a predetermined total time T.

For example, the GM base station 130 transmits a narrow beam toward some direction of the GM cell at timing $t_1$, and then, transmits a narrow beam at timing $t_2$ while shifting the transmission direction by a beam width Φ in the azimuth angle direction (see FIG. 21A). It is possible to transmit the IA signal transmitted at time intervals τ by using the bandwidth of the entire system of the communication system.

In addition, FIG. 21 shows the case of scanning with the IA signal in two dimensions (2D), and scanning may be performed in three dimensions (3D). For example, an angle of elevation is added to the transmission direction of the narrow beam of the IA signal for transmission, and by changing the beam in the azimuth angle direction and the angle of elevation direction at time intervals τ, it is also possible to scan all GM base mobile stations 120 positioned in the area of the GM cell.

Figure 22:
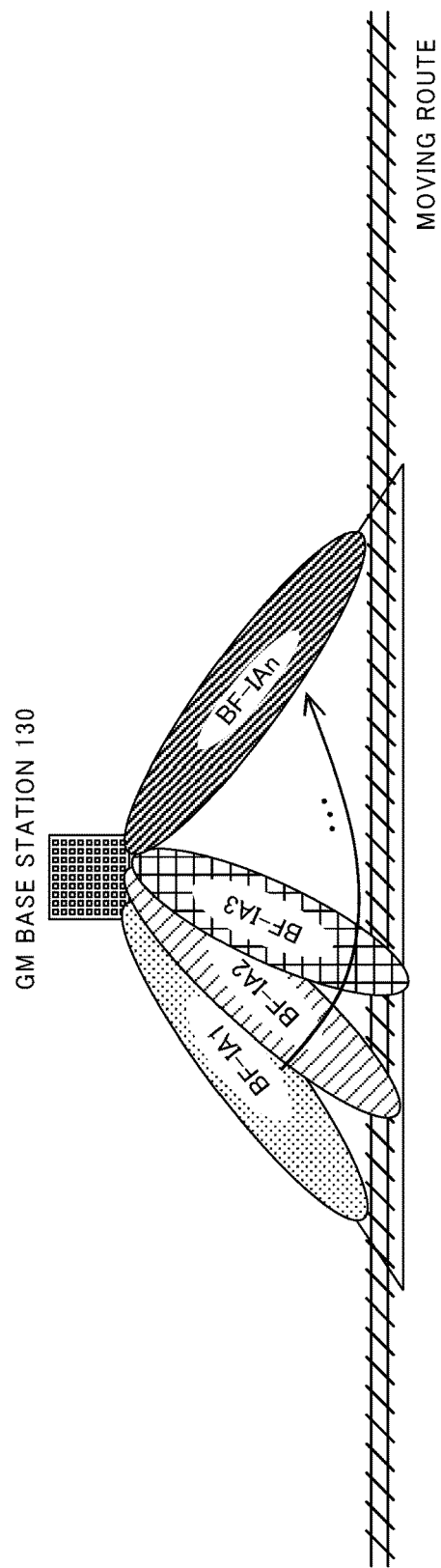
FIG. 22 is a diagram showing one example in the case where the GM base station performs all range scanning of the GM cell.

Thus, the GM base station 130 transmits a plurality of IA signals not only to the cell edge region but also to the entire GM cell, and is thereby capable of detecting the GM mobile station 120 inside the GM cell, even when the station 130 makes the mistake of not detecting the GM mobile station 120 in the waiting scanning region (see FIG. 22). In addition, it is preferable that transmission (GM cell all range scanning) of the IA signal to the entire GM cell is performed at predetermined time intervals (for example, 10 frames). Further, it is possible to handle the interval of GM cell all range scanning as a system parameter.

For the IA signal used in the cell edge region (waiting scanning range), the GM base station 130 uses a BF weight with a wide beam, performs assignment (frequency multiplexing) to a part of the frequency band, and the like, and is thereby capable of executing the all range scanning in the same time slots as in the waiting scanning range. Further, in the case of performing GM cell all range scanning, the GM base station 130 is also capable of scanning a range except the cell edge region (waiting scanning range).

When the GM base station 130 performs GM cell all range scanning, the GM mobile station 120 performs the same operation as in the cell edge region (waiting scanning range). In other words, the GM mobile station 120 transmits the information on the identification information (beam ID) of the detected IA signal and information on reception quality (RSRP, RSRQ, etc.) to the GM base station 130 as feedback.

By this means, the GM base station 130 is also capable of grasping weight information associated with a particular IA signal for the GM mobile station 120 that is not detected in the waiting scanning range, as in the GM mobile station 120 that is detected in the waiting scanning range. The GM base station 130 uses the weight information in radio communications with the GM mobile station 120 subsequent to connection. Further, based on the detection mistake (failure rate) in the waiting scanning range, the GM base station 130 adaptively adjusts the IA signal to transmit in the waiting scanning range.

(Modification)

In addition, the above-mentioned Embodiment illustrates the method of detecting the GM mobile station 120 using a plurality of IA signals transmitted from the GM base station 130 to the cell edge region, but this Embodiment is not limited thereto. For example, such a configuration may be made that the GM base station 130 detects the GM mobile station 120 using a sensor and IA signal together.

Figure 17:
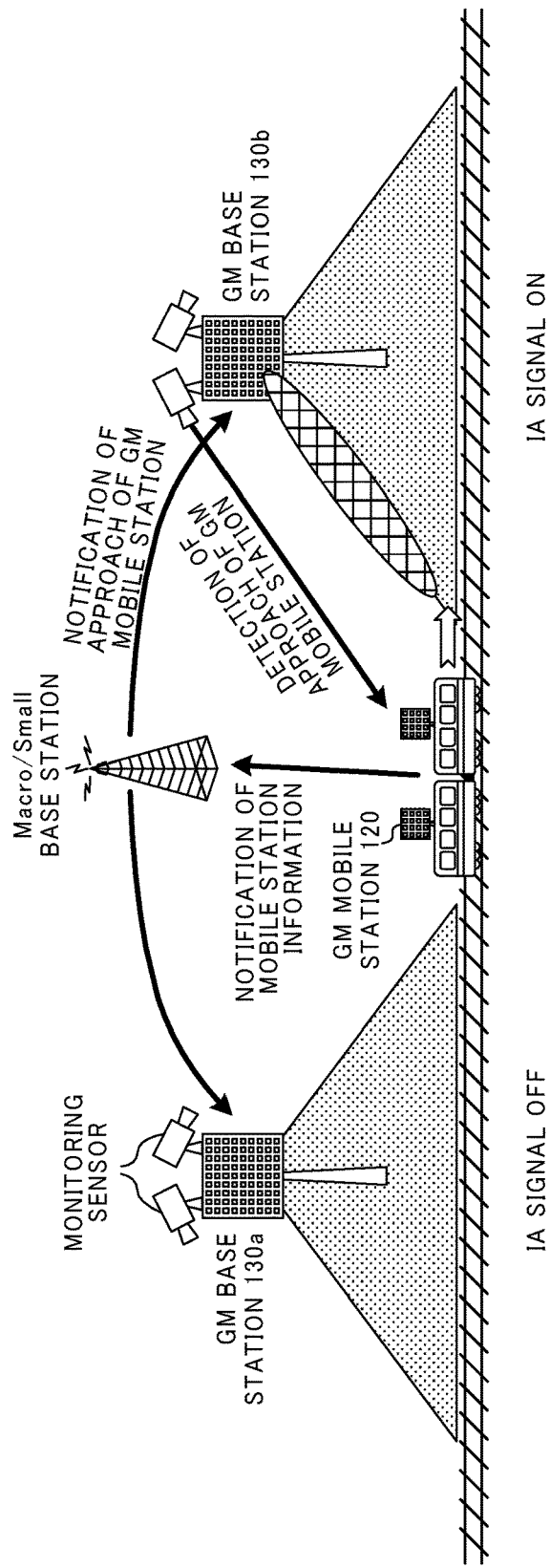
FIG. 17 is a diagram showing one example of a method of detecting the GM mobile station in the GM base station.

For example, the GM base station 130 may be equipped with a monitoring sensor (camera, laser, radar and the like) to detect the approach of the GM mobile station 120 with the monitoring sensor. In this case, at the time of detecting the GM mobile station 120 with the monitoring sensor, the GM base station 130 is capable of starting transmission of the IA signal in the direction in which the GM mobile station 120 approaches (see FIG. 17). At this point, in order to improve monitoring accuracy in the GM base station 130, it is preferable that the GM mobile station 120 is provided with a marker, beacon, reflecting substance or the like. By this means, the GM base station 130 is capable of efficiently detecting the approach of the GM mobile station 120, and it is thereby possible to reduce a transmission time of the IA signal.

Further, as a method of detecting the approach of the GM mobile station 120, the GM mobile station 120 may notify the macro base station and small base station of the information (position, speed, direction and the like) on the GM mobile station at predetermined intervals so that the macro cell and small cell notify the GM base station 130 of the approach of the GM mobile station 120. Alternatively, such a configuration may be made that the information (position, speed, direction and the like) on the GM mobile station 120 is notified to the GM base station 130 via the macro base station and small base station, and that the GM base station 130 side judges the approach of the GM mobile station 120. In addition, the interval at which the GM mobile station 120 notifies is capable of being set as appropriate, in consideration of the speed and the like of the GM mobile station 120.

Figure 18:
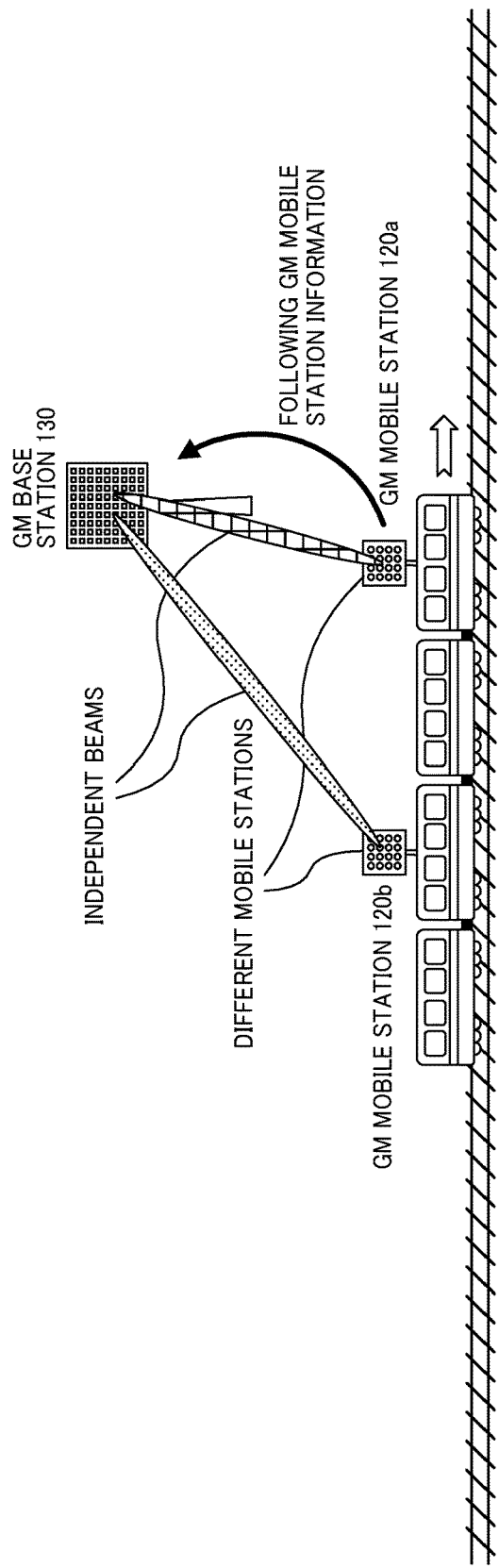
FIG. 18 is an explanatory diagram of communication operation in the case where a plurality of GM mobile stations is mounted on a moving object.

Furthermore, when a plurality of GM mobile stations 120 spatially spaced is mounted on the same moving object as shown in FIG. 18, the GM base station 130 identifies a plurality of GM mobile stations as different GM mobile stations. In this case, it is preferable that the GM mobile station 120a mounted in the beginning direction of the moving object notifies the GM base station 130 of the information on the following GM mobile station 120b. In this case, based on the information about the other GM mobile station 120b notified from the GM mobile station 120a mounted in the beginning direction, the GM base station 130 is capable of simplifying the beam scanning procedure (for example, calculation of a prediction beam for the following GM mobile station 120b and the like) for the following GM mobile station 120b. In addition, as the information on the following GM mobile station 120b, there are the GM mobile station interval, the number of GM mobile stations, apparatus configuration and the like.

In addition, the above-mentioned description mentions the case where the GM base station 130 transmits an IA signal, and the GM mobile station 120 receives the IA signal, but this Embodiment is not limited thereto. For example, such a configuration may be made that the GM mobile station 120 transmits an IA signal, and that the GM base station 130 receives the IA signal. In this case, in the above-mentioned description, it is possible to inversely read transmission/reception in the GM base station 130 and transmission/reception in the GM mobile station 12 with each other to apply.

(Configurations of the GM Base Station and GM Mobile Station)

Configurations of the GM base station and GM mobile station according to this Embodiment will be described below with reference to FIGS. 19 and 20.

Figure 19:
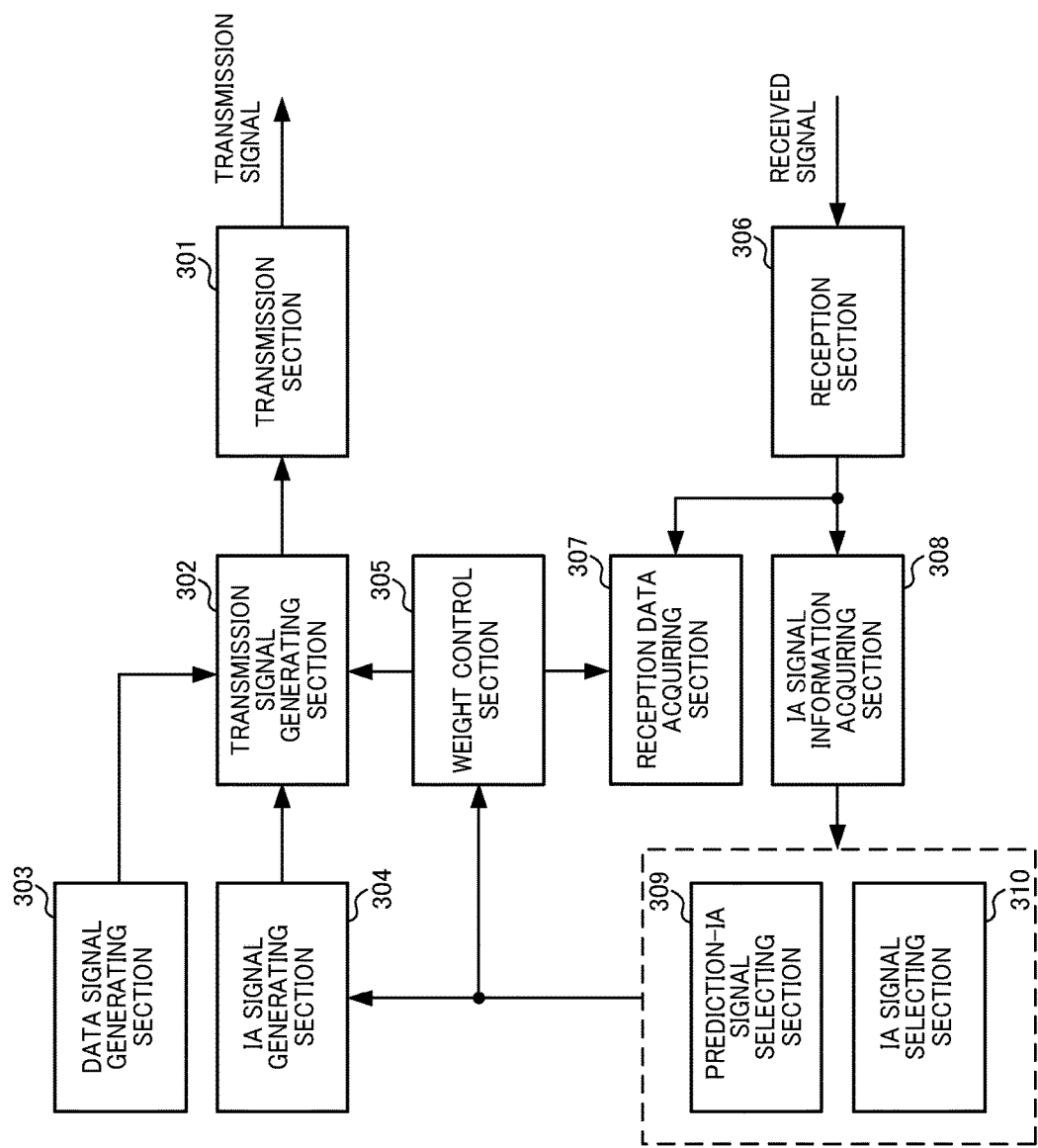
FIG. 19 is a function block diagram of the GM base station according to this Embodiment.

FIG. 19 is one example of a function block diagram of the GM base station according to this Embodiment. The GM base station has a transmission section 301, transmission signal generating section 302, data signal generating section 303, IA signal generating section 304, weight control section 305, reception section 306, reception data acquiring section 307, IA signal information acquiring section 308, prediction-IA signal selecting section 309, and IA signal selecting section 310. In addition, FIG. 19 shows function blocks characteristic of the GM base station, and it is assumed that the GM base station naturally has other function blocks required for radio communications.

The IA signal generating section 304 generates an IA signal to transmit to the GM mobile station. In the case of transmitting the IA signal to the cell edge region, as shown in FIG. 4, the IA signal generating section 304 generates a plurality of IA signals (IA1 to IAn signals). Further, based on information from the IA signal selecting section 310 and/or prediction-IA signal selecting section 309, the IA signal generating section 304 generates predetermined IA signals (IA signal for data transmission, IA signal for prediction) for the GM mobile station moving inside the GM cell.

The data signal generating section 303 generates data signals (user data, control signal and the like) to transmit to the GM mobile station. The transmission signal generating section 302 generates a downlink transmission signal by applying a predetermined BF weight to the IA signal and data signal. The BF weight to apply to the IA signal and data signal is controlled by the weight control section 305.

The weight control section 305 (control section) controls the BF weight to apply to the IA signal and data signal transmitted from the GM base station. In the case of transmitting the IA signal to the cell edge region, the weight control section 305 applies different BF weights to a plurality of IA signals (IA1 to IAn signals). Further, based on the information from the IA signal selecting section 310 and/or prediction-IA signal selecting section 309, the weight control section 305 is capable of determining the weight to apply to the transmission signal.

The transmission section 301 transmits the transmission signal (IA signal, data signal and the like) with the BF weight applied. In the case of transmitting the IA signal in the cell edge region, the transmission section 301 switches a plurality of IA signals with different BF weights applied respectively at predetermined intervals to transmit (see FIG. 4). At this point, the transmission section 301 is capable of associating each of the IA signals with different BF weights applied with a predetermined time slot to transmit.

Further, the transmission section 301 transmits the IA signal for a data signal and IA signal for prediction respectively in predetermined time slots, while performing division multiplexing on the IA signal and data signal in the time domain to transmit (see FIGS. 9 and 10). Furthermore, when the GM mobile station receives a plurality of IA signals, the transmission section 301 is capable of performing spatial multiplexing on the data signal in time slots in which the IA signal is not transmitted to transmit (see FIGS. 11 and 12). Still furthermore, the transmission section 301 transmits the information on the IA signal for a data signal and IA signal for prediction and the like to the GM mobile station.

In addition, allocation to radio resources (time slots) of the IA signal and data signal transmitted in the transmission section 301 is controlled by a scheduler or the like.

The reception section 306 receives the information on the IA signal received in the GM mobile station, information on the GM mobile station, uplink data signal and the like. The IA signal information acquiring section 308 acquires the information (identifier of the IA signal, channel estimation result and the like) on the IA signal transmitted from the GM mobile station as feedback among the information received in the reception section 306.

Based on the information acquired in the IA signal information acquiring section 308, the IA signal selecting section 310 selects an IA signal (IA signal having the BF weight to apply to a data signal) for the data signal. For example, the IA signal received (acquired) in the GM mobile station is selected as the IA signal for the data signal. The prediction-IA signal selecting section 309 predicts a beam (IA signal) that the moving GM mobile station next receives (acquires) from the moving speed and direction of the GM mobile station. For example, the prediction-IA signal selecting section 309 predicts the position of the GM mobile station after a lapse of certain time from the moving speed, direction and route shape, and selects an IA signal corresponding to the predicted direction as a prediction beam.

The reception data acquiring section 307 acquires uplink data transmitted from the GM mobile station. The reception data acquiring section 307 is capable of acquiring uplink data using the BF weight used in downlink transmission as an uplink reception weight.

Figure 20:
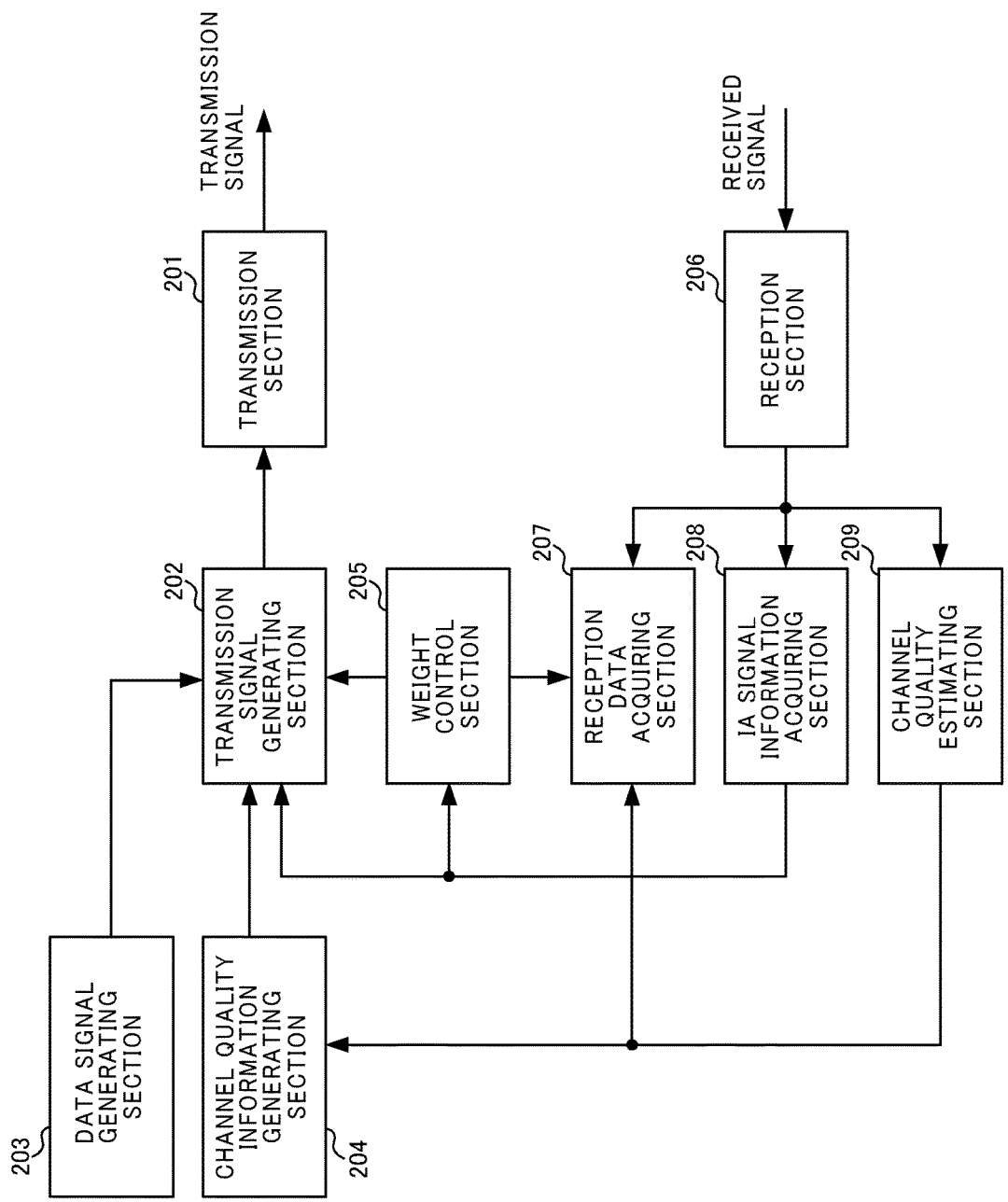
FIG. 20 is a function block diagram of the GM mobile station according to this Embodiment.

FIG. 20 is one example of a function block diagram of the GM mobile station according to this Embodiment. The GM mobile station has a transmission section 201, transmission signal generating section 202, data signal generating section 203, channel quality information generating section 204, weight control section 205, reception section 206, reception data acquiring section 207, IA signal information acquiring section 208, and channel quality estimating section 209. In addition, FIG. 20 shows function blocks characteristic of the GM mobile station, and it is assumed that the GM mobile station naturally has other function blocks required for radio communications.

The reception section 206 receives the IA signal and data signal transmitted from the GM base station. In addition, the reception section 206 is also capable of receiving DL signals transmitted from the macro base station, small base station and the like.

The IA signal information acquiring section 208 acquires the information (identification number of the IA signal and the like) on the IA signal received in the reception section 206. Further, the IA signal information acquiring section 208 also acquires the information (information on the IA signal for a data signal and IA signal for prediction and the like) on the IA signal transmitted from the GM base station, the macro base station or the small base station. The information on the IA signal acquired in the IA signal information acquiring section 208 is output to the weight control section 205.

The reception data acquiring section 207 acquires the data transmitted from the GM base station. The reception data acquiring section 207 generates a proper reception weight from a channel estimation result corresponding to the IA signal for a data signal notified from the GM base station, and is thereby capable of acquiring downlink data.

The channel quality estimating section 209 performs channel estimation using the IA signal transmitted from the GM base station. Based on the channel estimation result in the channel quality estimating section 209, the channel quality information generating section 204 generates channel quality information. When the quality of the IA signal for prediction received in the GM mobile station is higher than that of the IA signal for a data signal, or the quality of the IA signal for a data signal is decreased to a predetermined reference value or less, the channel quality information generating section 204 generates the information (beam change request) on the channel quality information.

The data signal generating section 203 generates a data signal to transmit to the GM base station. The transmission signal generating section 202 applies a predetermined BF weight to the data signal and the like to generate an uplink transmission signal. The BF weight applied to the data signal is controlled by the weight control section 205.

The weight control section 205 controls the weight to apply to the data signal and the like transmitted from the GM mobile station. For example, the weight control section 205 is capable of applying the reception weight of the downlink signal as a transmission weight of an uplink signal.

The transmission section 201 transmits the transmission signal (uplink data signal and the like) with the BF weight applied. Further, the transmission section 201 transmits the information on the received IA signal and the information on the GM mobile station. The transmission section 201 selects a transmission destination (GM base station, macro base station or small base station) of the UL signal corresponding to the contents of the signal to transmit.

As described above, according to the radio communication system according to this Embodiment, the configuration is provided in which the user terminal inside the moving object and GM base station communicate with each other via the GM mobile station for group mobility, and therefore, without adding any modification to the user terminal, it is possible to improve system performance of the entire radio communication system. Further, in this Embodiment, since the GM base station uses the IA signal, and controls the BF weight as appropriate corresponding to reception circumstances of the IA signal in the GM mobile station, even when the moving object does not move regularly, it is possible to select the BF weight suitable for communications between the GM base station and the GM mobile station.

As described above, the present invention is specifically described using the above-mentioned Embodiment, but it is obvious to a person skilled in the art that the invention is not limited to the Embodiment described in the Description. The invention is capable of being carried into practice as modified and changed aspects without departing from the subject matter and scope of the invention defined by the descriptions of the scope of the claims. Accordingly, the descriptions of the Description are intended for illustrative explanation, and do not have any restrictive meaning to the invention.

The present application is based on Japanese Patent Application No. 2013-261619 filed on Dec. 18, 2013, entire content of which is expressly incorporated by reference herein.

The invention claimed is:

1. A radio base station for forming a cell on a moving path of a moving object to communicate with a mobile station provided in the moving object using beam forming, comprising:
    a transmitter that transmits a plurality of acquisition signals applied with different beam forming weights respectively to at least an edge region of the cell formed on the moving path of the moving object; and
    a processor that controls a beam forming weight to apply to a data signal transmitted to the mobile station, based on information notified from the mobile station receiving an acquisition signal,
    wherein the acquisition signal is a signal obtained by combining a sequence for a synchronization signal and a sequence of a reference signal for channel estimation in a Long Term Evolution (LTE) system or a Long Term Evolution-Advanced (LTE-A) system, and
    wherein the acquisition signal is transmitted in a time slot of a subframe.

2. The radio base station according to claim 1, wherein the transmitter switches the plurality of acquisition signals applied with different beam forming weights respectively at predetermined intervals to transmit.

3. The radio base station according to claim 2, wherein the transmitter associates the plurality of acquisition signals applied with different beam forming weights respectively with predetermined time slots to transmit.

4. The radio base station according to claim 3, further comprising:
    a processor that selects an acquisition signal for a data signal having a beam forming weight to apply to the data signal, and an acquisition signal for prediction having a possibility that the mobile station next receives,
    wherein the transmitter transmits the acquisition signal for a data signal and the acquisition signal for prediction respectively in predetermined time slots.

5. The radio base station according to claim 4, wherein the transmitter performs transmission of the data signal using a time slot in which the acquisition signal for a data signal and the acquisition signal for prediction are not transmitted.

6. The radio base station according to claim 4, wherein when the mobile station notifies of information on a plurality of acquisition signals, the processor selects a plurality of acquisition signals for data signals and a plurality of acquisition signals for prediction, and the transmitter performs spatial multiplexing on the data signals with different beam forming weights of the acquisition signals for data signals applied to transmit.

7. The radio base station according to claim 4, wherein when quality information of the acquisition signal for a data signal notified from the mobile station is a predetermined value or less, the processor applies a beam forming weight of the acquisition signal for prediction to a data signal.

8. The radio base station according to claim 2, further comprising:
    a processor that selects an acquisition signal for a data signal having a beam forming weight to apply to the data signal, and an acquisition signal for prediction having a possibility that the mobile station next receives,
    wherein the transmitter transmits the acquisition signal for a data signal and the acquisition signal for prediction respectively in predetermined time slots.

9. The radio base station according to claim 8, wherein the transmitter performs transmission of the data signal using a time slot in which the acquisition signal for a data signal and the acquisition signal for prediction are not transmitted.

10. The radio base station according to claim 8, wherein when the mobile station notifies of information on a plurality of acquisition signals, the processor selects a plurality of acquisition signals for data signals and a plurality of acquisition signals for prediction, and the transmitter performs spatial multiplexing on the data signals with different beam forming weights of the acquisition signals for data signals applied to transmit.

11. The radio base station according to claim 8, wherein when quality information of the acquisition signal for a data signal notified from the mobile station is a predetermined value or less, the processor applies a beam forming weight of the acquisition signal for prediction to a data signal.

12. The radio base station according to claim 1, further comprising:
   a processor that selects an acquisition signal for a data signal having a beam forming weight to apply to the data signal, and an acquisition signal for prediction having a possibility that the mobile station next receives,
   wherein the transmitter transmits the acquisition signal for a data signal and the acquisition signal for prediction respectively in predetermined time slots.

13. The radio base station according to claim 12, wherein the transmitter performs transmission of the data signal using a time slot in which the acquisition signal for a data signal and the acquisition signal for prediction are not transmitted.

14. The radio base station according to claim 12, wherein when the mobile station notifies of information on a plurality of acquisition signals, the processor selects a plurality of acquisition signals for data signals and a plurality of acquisition signals for prediction, and the transmitter performs spatial multiplexing on the data signals with different beam forming weights of the acquisition signals for data signals applied to transmit.

15. The radio base station according to claim 12, wherein when quality information of the acquisition signal for a data signal notified from the mobile station is a predetermined value or less, the processor applies a beam forming weight of the acquisition signal for prediction to a data signal.

16. A mobile station provided in a moving object to communicate with a radio base station for forming a cell on a mobile path of the moving object using beam forming, comprising:
   a receiver that receives an acquisition signal and a data signal transmitted from the radio base station; and
   a transmitter that transmits information on a received acquisition signal,
   wherein the receiver receives an acquisition signal having a beam forming weight to apply to a data signal, and an acquisition signal for prediction having a possibility of receiving next, as the acquisition signal,
   wherein the acquisition signal is a signal obtained by combining a sequence for a synchronization signal and a sequence of a reference signal for channel estimation in a Long Term Evolution (LTE) system or a Long Term Evolution-Advanced (LTE-A) system, and
   wherein the acquisition signal is received in a time slot of a subframe.

17. A radio communication method of a radio base station for forming a cell on a moving path of a moving object and a mobile station provided in the moving object, comprising:
   in the radio base station, transmitting a plurality of acquisition signals applied with different beam forming weights respectively to at least an edge region of the cell formed on the moving path of the moving object;
   controlling a beam forming weight to apply to a data signal transmitted to the mobile station, based on information notified from the mobile station receiving an acquisition signal;
   in the mobile station, receiving an acquisition signal and a data signal transmitted from the radio base station; and
   transmitting information on a received acquisition signal,
   wherein the acquisition signal is a signal obtained by combining a sequence for a synchronization signal and a sequence of a reference signal for channel estimation in a Long Term Evolution (LTE) system or a Long Term Evolution-Advanced (LTE-A) system, and
   wherein the acquisition signal is transmitted in a time slot of a subframe.

* * * * *